(12) United States Patent
Taylor et al.

(10) Patent No.: US 8,209,587 B1
(45) Date of Patent: Jun. 26, 2012

(54) SYSTEM AND METHOD FOR ELIMINATING ZEROING OF DISK DRIVES IN RAID ARRAYS

(75) Inventors: James Taylor, Livermore, CA (US); Atul Goel, Foster City, CA (US); James Leong, Hillsborough, CA (US)

(73) Assignee: NetApp, Inc., Sunnyvale, CA (US)

( * ) Notice: Subject to any disclaimer, the term of this patent is extended or adjusted under 35 U.S.C. 154(b) by 1461 days.

(21) Appl. No.: 11/734,314

(22) Filed: Apr. 12, 2007

(51) Int. Cl.
*G11C 29/00* (2006.01)

(52) U.S. Cl. .......................... 714/770; 711/114

(58) Field of Classification Search .................. 714/770; 711/114
See application file for complete search history.

(56) References Cited

U.S. PATENT DOCUMENTS

| | | | |
|---|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,547,882 A | 10/1985 | Tanner |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |

(Continued)

FOREIGN PATENT DOCUMENTS

EP 1 324 200 A2 7/2003

(Continued)

OTHER PUBLICATIONS

Bultman, David L., High Performance SCSI Using Parallel Drive Technology, In Proc. BUSCON Conf., pp. 40-44, Anaheim, CA, Feb. 1988.

(Continued)

*Primary Examiner* — Guy Lamarre
(74) *Attorney, Agent, or Firm* — Cesari and McKenna, LLP

(57) ABSTRACT

Embodiments of the present invention disclose a technique for providing an indication whether data stored on a disk drive are invalid. As used herein, invalid data are data written prior to the disk drive being added to an array of the disk drives or data in a block that has become free and which has been removed from the corresponding parity block of the stripe. Knowing that the disk drive was written prior to the drive being added to the existing array or having data which has become invalid allows a storage server to ignore the invalid data and not to use it when computing parity (i.e., a data protection value computed as a result of a logical operation on data blocks in a stripe in the array of disk drives). This, in turn, eliminates the need to zero disk drives or to perform parity re-computation prior to using the disk drives.

15 Claims, 12 Drawing Sheets

U.S. PATENT DOCUMENTS

| | | | |
|---|---|---|---|
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,271,012 | A | 12/1993 | Blaum et al. |
| 5,274,799 | A | 12/1993 | Brant et al. |
| 5,305,326 | A | 4/1994 | Solomon et al. |
| 5,351,246 | A | 9/1994 | Blaum et al. |
| 5,375,128 | A | 12/1994 | Menon et al. |
| 5,410,667 | A | 4/1995 | Belsan et al. |
| 5,537,567 | A | 7/1996 | Galbraith et al. |
| 5,579,475 | A | 11/1996 | Blaum et al. |
| 5,623,595 | A | 4/1997 | Bailey |
| 5,657,468 | A | 8/1997 | Stallmo et al. |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,948,110 | A | 9/1999 | Hitz et al. |
| 5,950,225 | A | 9/1999 | Kleiman |
| 5,963,962 | A | 10/1999 | Hitz et al. |
| 6,038,570 | A | 3/2000 | Hitz et al. |
| 6,092,215 | A | 7/2000 | Hodges et al. |
| 6,138,125 | A | 10/2000 | DeMoss |
| 6,138,126 | A | 10/2000 | Hitz et al. |
| 6,138,201 | A | 10/2000 | Rebaski |
| 6,158,017 | A | 12/2000 | Han et al. |
| 6,223,300 | B1 | 4/2001 | Gotoh |
| 6,247,157 | B1 | 6/2001 | Edirisooriya |
| 6,289,356 | B1 | 9/2001 | Hitz et al. |
| 6,532,548 | B1 | 3/2003 | Hughes |
| 6,557,123 | B1 | 4/2003 | Wiencko et al. |
| 6,571,326 | B2 | 5/2003 | Spiegel et al. |
| 6,581,185 | B1 | 6/2003 | Hughes |
| 6,671,772 | B1 | 12/2003 | Cousins |
| 6,742,137 | B1 | 5/2004 | Frey, Jr. |
| 6,779,095 | B2 | 8/2004 | Selkirk et al. |
| 6,904,498 | B2 * | 6/2005 | Stolowitz ..................... 711/114 |
| 6,993,701 | B2 | 1/2006 | Corbett et al. |
| 7,073,115 | B2 | 7/2006 | English et al. |
| 7,203,892 | B2 | 4/2007 | Corbett et al. |
| 7,328,305 | B2 | 2/2008 | Kleiman et al. |
| 7,409,625 | B2 | 8/2008 | Corbett et al. |
| 7,454,445 | B2 | 11/2008 | Lewis et al. |
| 2002/0124137 | A1 | 9/2002 | Ulrich et al. |
| 2002/0184556 | A1* | 12/2002 | Hashemi .......................... 714/6 |
| 2008/0109616 | A1 | 5/2008 | Taylor et al. |

FOREIGN PATENT DOCUMENTS

| | | |
|---|---|---|
| WO | WO-01/13236 A1 | 2/2001 |
| WO | WO-02/29539 A2 | 4/2002 |

OTHER PUBLICATIONS

Evans The Tip of the Iceberg:RAMAC Virtual Array—Part I, Technical Support, Mar. 1997, pp. 1-4.

Gibson, Garth A., et al., Coding Techniques for Handling Failures in Large Disk Arrays, Technical Report UCB/CSD88/477, Computer Science Division, University of California, Jul. 1988.

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al., Strategic Directions in Storage I/O Issues in Large-Scale Computing, ACM Computing Survey, 28(4):779-93, Dec. 1996.

Hitz, David, TR3002 File System Design for a NFS File Server Appliance, Network Appliance, Inc.

Menon, Jai, et al., Methods for Improved Update Performance of Disk Arrays, IBM Almaden Research Center, IEEE, Jan. 1992, 10 pages.

Menon, Jai, et al., Floating Parity and Data Disk Arrays, Journal of Parallel and Distributed Computing, Boston: Academic Press. Inc., vol. 17 No. 1 and 2, Jan./Feb. 1993, 13 pages.

Park, Arvin, et al., Providing Fault Tolerance in Parallel Secondary Storage Systems, Technical Report CS-TR-057-86, Princeton, Nov. 1986.

Patel, Arvind M., Adaptive Cross-Parity (AXP) Code for a High-Density Magnetic Tape Subsystem, IBM Technical Disclosure Bulletin 29(6):546-562, Nov. 1985.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987).

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).

Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.

Schulze, Martin E., Considerations in the Design of a RAID Prototype, Computer Science Division, Department of Electrical Engineering and Computer Sciences, Univ. of CA, Berkley, Aug. 25, 1988.

Schulze, Martin., et al., How Reliable is a RAID?, Proceedings of COMPCON, 1989, pp. 118-123.

Stonebraker, Michael, et al., The Design of XPRS, Proceedings of the 14th VLDB Conference, LA, CA (1988).

* cited by examiner

SYSTEM AND METHOD FOR ELIMINATING ZEROING OF DISK DRIVES IN RAID ARRAYS

FIELD OF THE INVENTION

The present invention pertains to storage systems, and more particularly, to optimizing data write operations.

BACKGROUND

A storage server is a processing system adapted to store and retrieve data on behalf of one or more client processing systems ("clients") in response to input/output (I/O) client requests. A storage server can be used for many different purposes, such as to provide multiple users with access to shared data or to backup data.

One example of a storage server is a file server. A file server operates on behalf of one or more clients to store and manage shared files in a set of mass storage devices, such as magnetic or optical storage disks or tapes. The mass storage devices may be organized into one or more volumes of Redundant Array of Independent (or Inexpensive) Disks (RAID). Another example of a storage server is a device, which provides clients with block-level access to stored data, rather than file-level access, or a device, which provides clients with both file-level access and block-level access.

In a storage server, data gets corrupted or lost from time to time, for example, upon the failure of one of the mass storage devices. Therefore, it is common to implement techniques for protecting the stored data. Currently, these techniques involve calculating a data protection value (e.g., parity) and storing the parity in various locations. Parity may be computed as an exclusive-OR (XOR) of data blocks in a stripe spread across multiple disks in a disk array. In a single parity scheme, e.g. RAID-4 or RAID-5, an error can be corrected in any block in the stripe using a single parity block (also called "row parity"), which can be computed as a result of a logical operation on data blocks in a stripe. In a dual parity scheme, e.g. RAID Double Parity (RAID-DP), a technique invented by Network Appliance Inc. of Sunnyvale, Calif., errors resulting from a two-disk failure can be corrected using two parity blocks.

When one or more data blocks in a stripe are modified, a parity block has to be updated for that stripe. Two techniques are known for modifying data blocks and thus updating a parity block. According to a first method, known as "Read Modify Write" or "Parity By Subtraction Write" (also referred to herein as "a subtraction method"), data blocks that are being modified within a stripe and a parity block for the stripe are read into memory. Then an exclusive OR (XOR) operation is performed on the read data blocks and the parity block. The result of the XOR operation is XOR'ed with new data blocks to be written to compute new parity. Then, the result is written to the parity block in the stripe. When a large number of data blocks are modified, another method for writing data, known as "Write by Recalculation" (or as referred to herein, a "recalculation method") is used. According to this method, data blocks within a stripe that are not to be modified are read into memory. To compute new parity, the read data blocks are XOR'ed with a result of the XOR operation on new data blocks. The result is written to a parity block in the stripe on a disk.

Prior to using disk arrays for the first time or prior to adding a disk to an existing array, disk drives are zeroed (a zero value is written to the disks) to ensure that parity for each stripe is consistent with the data blocks in the stripes. A disk can be added to the existing array, for example, when it replaces another disk or when the number of disks is expanded in the array. The process of zeroing the disk though can be time-consuming and might require up to eight hours to complete. Moreover, this time increases as disk drive capacities are increasing.

An alternative to zeroing disk drives would be to read all data blocks in each stripe, calculate the parity and write the parity onto the disk. Any write requests received to the stripes that already had the parity calculated and written could be performed using either the recalculation method or the subtraction method. Any write requests to the stripes that had not had the parity calculated and written would be done using the recalculation method. An advantage of this technique is that the disks could be used immediately after the array was created. One of the shortcomings of this technique though is that reading all data drives, computing parity, and writing the computed parity to the disk would take much longer than it would take to zero the drives. In addition, even though the array can be used while this reparity process is running, the overhead of the reparity process will affect the performance of the system. Moreover, any writes that have to be done using a recalculation method may not be as efficient as they would have been had they been done by the subtraction method (which again requires parity being consistent with all the data blocks in a stripe).

Accordingly, what is needed is a mechanism that eliminates the need to zero disk drives prior to adding them to the system without adding overhead of parity recomputation to the entire array.

SUMMARY OF THE INVENTION

Embodiments of the present invention provide a method, system, and computer program product for providing an indication whether data stored on a disk drive are invalid. As used herein, invalid data are data written prior to the disk drive being added to an array of the disk drives, or data in a block that has become free (unallocated) and is removed from the parity block in the stripe. A disk drive can be added to an existing array, when, e.g., it replaces a disk in the array, the array is formed, or the array is expanded. Knowing that the disk drive stores data that were written prior to the drive being added to the existing array or is not needed allows a storage server to ignore the invalid data and not to use it when computing a parity block (i.e., a data protection value computed as a result of a logical operation on data blocks in a stripe in the array of disk drives). This, in turn, eliminates the need to zero disk drives or to perform parity re-computation prior to using the disk drives to ensure that the parity is consistent with the data in the corresponding stripe in the array.

According to one embodiment of the present invention, a unique disk drive ID is created for each disk drive when it is added to an array of disk drives. The disk drive ID is stored in a reserved area on the disk where other configuration information is stored. When a data block is written to a disk drive, a unique disk drive ID for that disk drive is written to a checksum block that is associated with the data block. A data block can be any chunk of data that a storage server is capable of recognizing and manipulating as a distinct entity When a parity block is written to a disk, a value indicating which data blocks are included in the parity block for that stripe is written to a checksum block that is associated with the parity block. A unique disk drive ID for the drive that stores parity for a stripe is also written to the checksum block.

When reading a data block from a disk drive as part of a write operation, data in the checksum block associated with the data block is compared to a disk drive ID that was stored in the configuration area of the disk drive. If the two match, it indicates that the data block was written after the disk was added to the array and is valid. If the two do not match, it indicates that the data block was written prior to the disk drive being added to the array or has become invalid. As noted above, knowing that the data block was written prior to the disk being added to the array allows the storage server to ignore that data block and not to use it for purposes of parity computation even without writing a zero value to that data block. A person of ordinary skill in the art would understand that any other mechanism can be used to provide an indication whether a disk drive stores valid data.

The inventive technique of the present invention can be used to optimize write operations, to perform more efficient reconstruction of data when a disk fails, to reduce reliance on "sick" disks for disk copies, and to improve error recovery, as described herein.

The inventive techniques of the present invention reduce or eliminate the number of read operations to perform a write operation. For example, when a value indicating which data blocks are included in a particular parity block for that stripe is cached in memory, it can be used to determine which data blocks are valid even without reading the data blocks. When performing a write operation, invalid data blocks are ignored and not read. This, in turn, reduces the number of read operations to complete a write operation.

According to another embodiment of the present invention, a write operation can be done without performing any read operation, if none of the data blocks that are not being modified in the stripe are valid. In this situation, parity is computed for a stripe where new data are written by performing a logical operation on only the new data blocks.

According to another embodiment, when data blocks that are being overwritten are not valid, but other data blocks in a stripe are valid, to reduce the number of read operations, the storage server issues a command to the disk that stores parity. The command, when executed at a disk that stores parity for a corresponding stripe, reads the parity block into memory, requests new data from the storage server, and computes new parity using the new data. The result of the computation is written to the parity disk. As a result of the execution of the command by the parity disk, the storage server does not need to read the old parity block and to compute the new parity using new data.

Furthermore, the present invention improves error recovery in an array in which one disk has a failure and another disk has a data block with a media error. To recover data from the data block that has a media error, the present invention determines whether data on the failed drive are valid, e.g., were written after the disk was added to the array. If the data on the failed drive are not valid, that data can be ignored when recovering the data block that has a media error.

Similarly, the inventive technique may reduce the number of read and write operations to reconstruct data from a failed drive by providing an indication whether data blocks on the failed drive were written prior to being added to the array or have become invalid. The inventive technique may reduce the number of read and write operations to copy data from a "sick" disk by providing an indication whether data stored on the sick disk are valid.

Although the present invention is described in the context of hard disk drives (HDD) or disks, a person of ordinary skill in the art would understand that the invention can be implemented with optical storage disks, tapes, or other types of storage devices. Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Embodiments of the present invention provide a method, system, and computer program product for providing an indication whether data stored on a disk drive are invalid. As used herein, "invalid data" are data written prior to the disk drive being added to an array of the disk drives or data in a block which has become free and which has been removed from the corresponding parity block in the stripe. Knowing that the disk drive stores data that were written prior to the drive being used in the existing array or have become invalid allows a storage server to ignore the invalid data and not to use it when computing a parity block (i.e., a data protection value computed as a result of a logical operation on data blocks in a stripe in the array of disk drives). This, in turn, eliminates the need to zero disk drives (by writing a zero value to the disks)

or to perform parity re-computation prior to using the disk drives to ensure that the parity is consistent with the data in the corresponding stripe in the array.

As used herein, "old data" means data that is currently stored in data blocks; "new data" refers to data that is to be written to the disks. "Old parity" refers to parity computed before a write command is executed, that is, before new data are written to disks. "New parity" refers to parity computed after a write command is executed, that is, after new data are written to the disks. Throughout this description, the "Read Modify Write" method for writing data is referred to herein as a "subtraction method." The "Parity By Recalculation Write" method for writing data is referred to herein as a "recalculation method."

An "aggregate" is a logical container for a pool of storage, which combines one or more physical mass storage devices (e.g., disks) or parts thereof into a single logical storage object, which contains or provides storage for one or more other logical data sets (e.g., volumes), but at a higher level of abstraction. A "volume" is a set of stored data associated with a collection of mass storage devices, such as disks, which obtains its storage from (i.e., is contained within) an aggregate, and which is managed as an independent administrative unit.

A "checksum block" is a block of data that is associated with a data block when a data block is written to a disk. According to one embodiment, the checksum block can store up to 64 bytes of data.

Figure 1A:
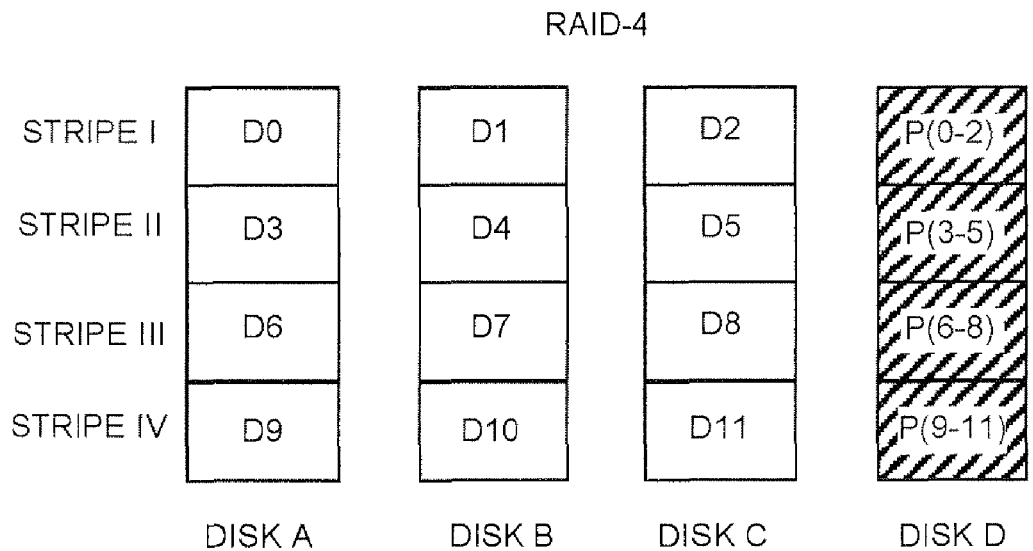
FIGS. 1A and 1B show arrangements of data blocks on disks according to RAID-4 and RAID-5, respectively.
Figure 1B:
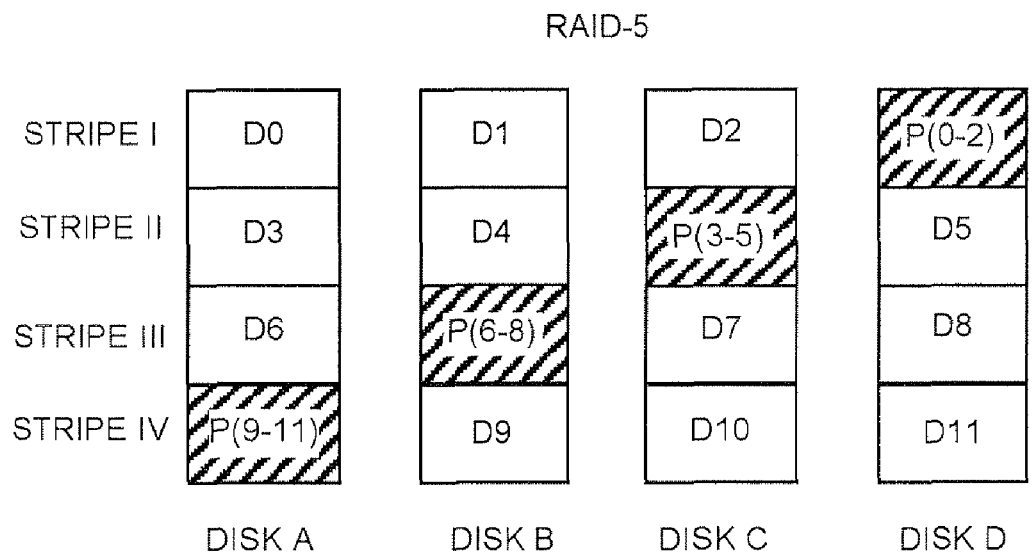

Referring now to FIGS. 1A and 1B, they show arrangements of data blocks on storage devices according to RAID-4 and RAID-5 respectively. In FIGS. 1A and 1B, data sent to a storage server from a client(s) for storage as part of a write operation may first be divided up into fixed-size, e.g., four Kilo Byte, blocks (e.g. D0, D1, etc.), which are then formed into groups that are stored as physical data blocks in a "stripe" (e.g. Stripe I, Stripe II, etc.) spread across multiple disks in an array. Row parity, e.g. an exclusive-OR (XOR) of the data in the stripe, is computed and may be stored in a parity protection block on disk D. The location of the row parity depends on the type of protection scheme or protocol implemented. FIG. 1A shows a RAID-4 scheme in which the row parity, e.g. P(0-2), P(3-5), P(6-8), and P(9-11) are stored in a dedicated disk (disk D). FIG. 1B shows a RAID-5 scheme in which the row parity is distributed across disks in the array.

1. System Architecture

Figure 2:
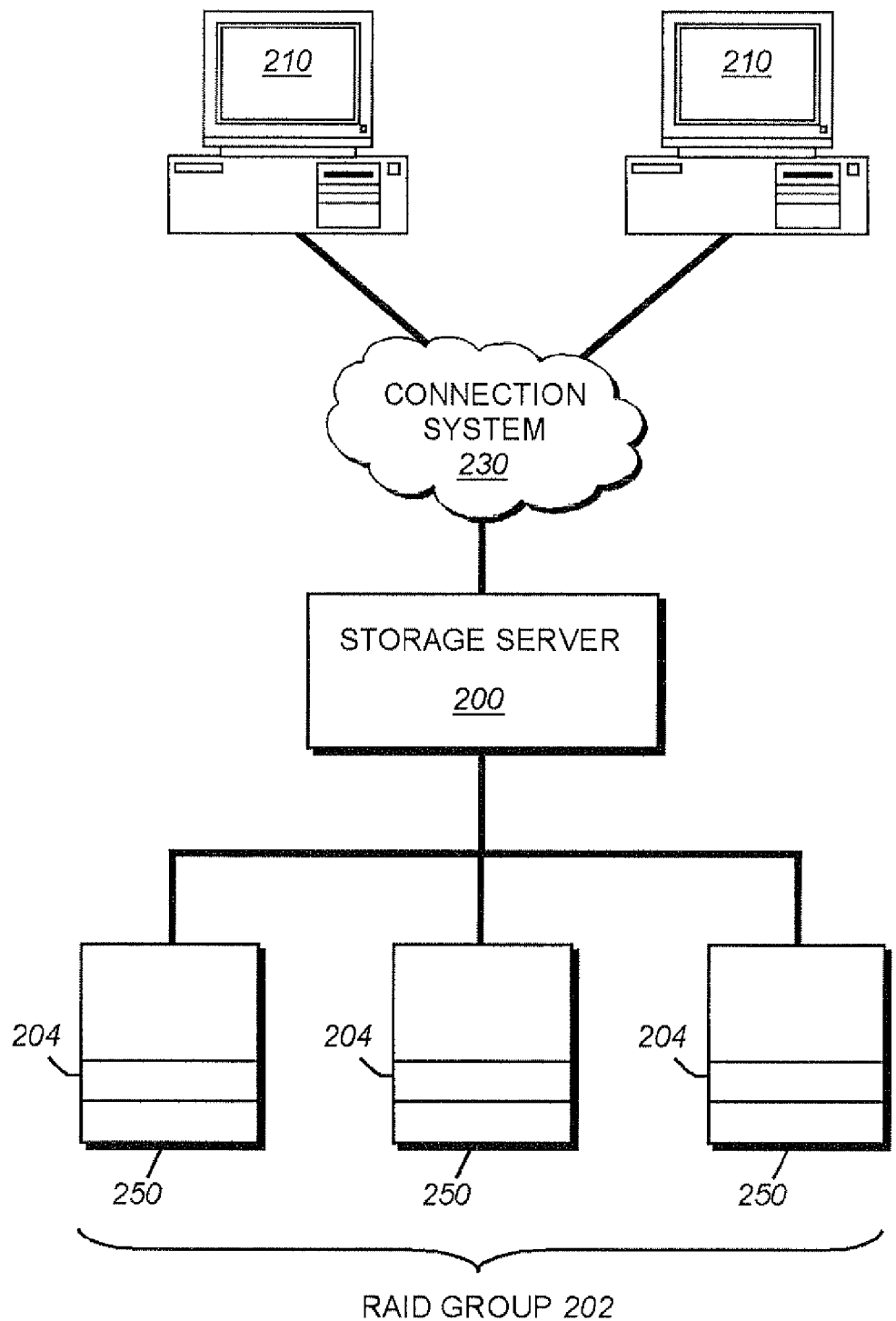
FIG. 2 shows a network environment that includes a storage server according to an embodiment of the present invention.

As noted, a mechanism for eliminating a process of zeroing disk drives prior to adding them to a RAID system can be implemented in a storage server, such as the one shown in FIG. 2. FIG. 2 shows a network environment that includes multiple clients 210, a storage server 200, and a collection of disks 250. Storage server 200 operates on behalf of clients 210 to store and manage shared files in a set of mass storage devices, such as magnetic or optical storage based disks or tapes. As previously described, storage server 200 can also be a device that provides clients 210 with a block-level access to stored data, rather than a file-level access, or a device which provides clients with both file-level access and block-level access. Storage server 200 in FIG. 2 is coupled locally to a set of clients 210 over connection system 230, such as a local area network (LAN), a wide area network (WAN), metropolitan are network (MAN) or the Internet. The connection system 230 may be embodied as an Ethernet network or a Fibre Channel (FC) network. Each client 210 may communicate with the storage server 200 over the connection system 230 by exchanging discrete frames or packets of data according to pre-defined protocols, such as TCP/IP.

Each of the clients 210 may be, for example, a conventional personal computer (PC), workstation, or the like. The storage server 200 receives various requests from the clients 210 and responds to these requests. The storage server 200 may have a distributed architecture; for example, it may include a separate N- ("network") blade and D- (disk) blade (not shown). In such an embodiment, the N-blade is used to communicate with clients 210, while the D-blade includes the file system functionality and is used to communicate with the disks 250. The N-blade and D-blade communicate with each other using an internal protocol. Alternatively, the storage server 200 may have an integrated architecture, where the network and data components are all contained in a single box and can be tightly integrated. The storage server 200 further may be coupled through a switching fabric to other similar storage servers (not shown) which have their own local disk subsystems. In this way, all of the disks 250 can form a single storage pool, to which any client of any of the file servers has access.

Storage of information on the storage system 200 is preferably implemented as one or more storage volumes that comprise physical storage disk drives 250 defining an overall logical arrangement of disk space. The disk drives within a volume are typically organized as one or more RAID groups (such as a RAID group 202 shown in FIG. 2). The physical disks of each RAID group include those disks configured to store striped data (D) and those disks configured to store parity (P) for the data, in accordance with an illustrative RAID-4 and RAID-5 level configurations. However, other RAID level configurations (e.g., RAID-DP) are also contemplated.

A disk drive within a RAID group has a reserved area that stores configuration information for that particular drive and a copy of the configuration information for the entire RAID group (in FIG. 2, the reserved area 204 is designated on each disk to store configuration information). The configuration information may include a type of a RAID group, a number of disk drives within a RAID group, the disk drive's position within the RAID group, as well as other information describing the RAID group and the disk drive. The configuration information can also be persisted to the memory (shown in FIG. 3) of the storage server 200.

According to an embodiment of the present invention, a unique identifier (ID) is created for each disk drive at the time when a RAID group is created or when a disk drive is added to the RAID group. The unique ID can be stored as part of the configuration information for that drive. In one implementation, to create a unique drive ID, an ID of a RAID group and a count can be used. Each RAID group when created is assigned a unique ID. When drives are assigned to the RAID group, each drive ID is created with this unique ID and a count for the drive starting, e.g., with 0. The count then can be incremented and used for the next drive. The count is then saved in the reserved area on each disk drive with other configuration information for the RAID group. If a disk is later added to the RAID group, this count is incremented and used for the new drive and then saved back to the area on each drive that stores configuration information. This ensures that no drives have the same drive ID.

In another implementation, a storage system's ID can be used along with the current timestamp to create a unique disk drive ID. As will be described in more detail throughout the description of the present invention, the unique disk drive ID is used to determine whether a data block was written prior to the disk being added to a RAID group or a data block has become free (unallocated) and is removed from the parity block in the stripe. Furthermore, although the present invention is described in the context of creating a unique disk drive ID, a person of ordinary skill in the art would understand that other techniques that produce a similar result can be used to provide an indication whether a disk drive stores valid data.

Figure 3:
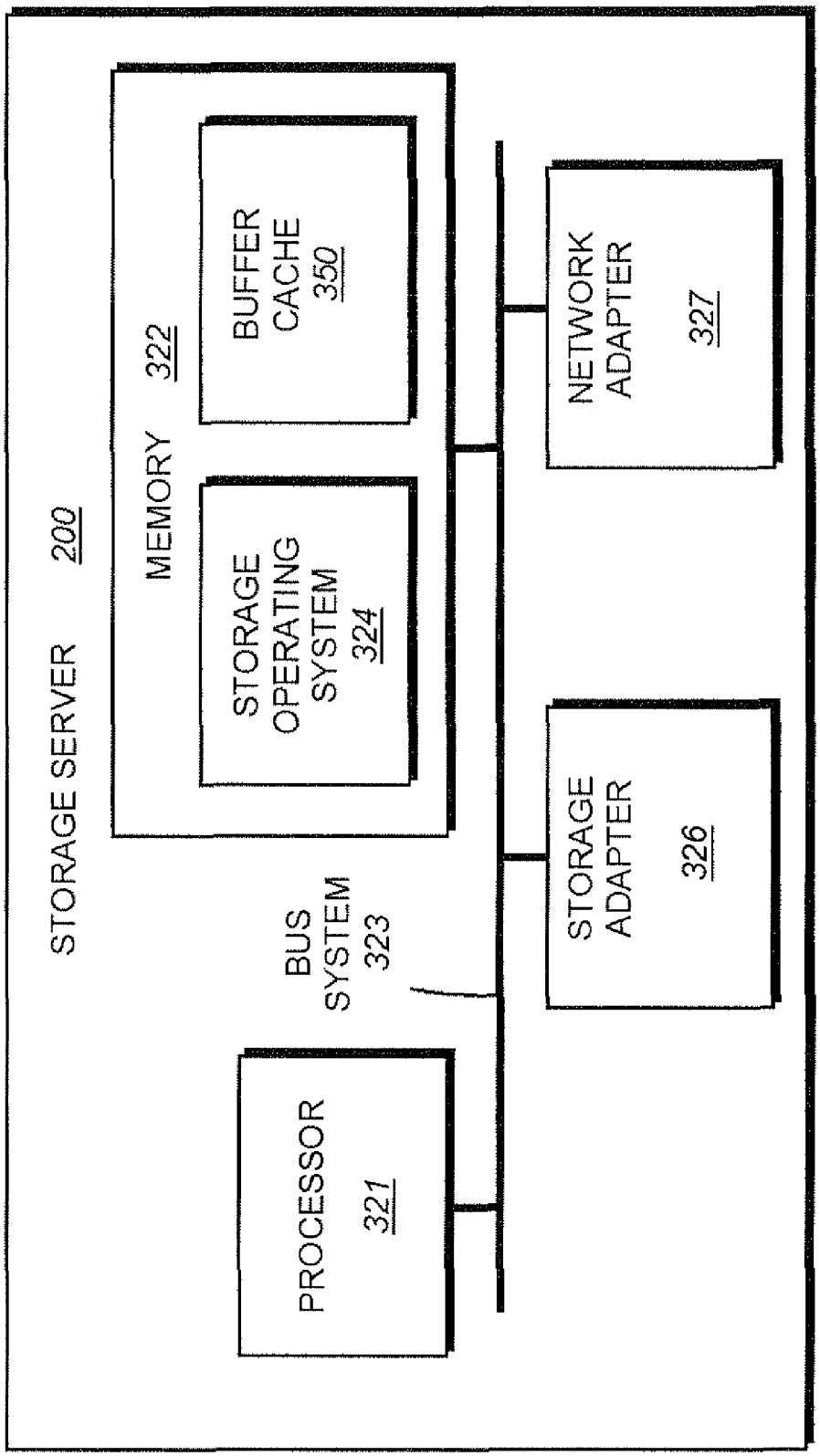
FIG. 3 is a diagram showing architecture of the storage server shown in FIG. 2 according to an embodiment of the present invention.

FIG. 3 is a diagram showing the architecture of the storage server 200 according to an embodiment of the present invention. The storage server 200 includes one or more processor(s) 321 and memory 322 coupled to a bus system 323. The bus system 323 shown in FIG. 3 may represent any one or more separate physical buses and/or point-to-point connections, connected by appropriate bridges, adapters and/or controllers. The bus system 323, therefore, may include, for example, a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 321 are the central processing units (CPUs) of the storage server 200 and, thus, control the overall operation of the storage server 200. In certain embodiments, the processor(s) 321 accomplish this by executing software, such as that described in more detail herein stored in memory 322. A processor 321 may include one or more programmable general-purpose or special-purpose microprocessors, digital signal processors (DSPs), programmable controllers, application specific integrated circuits (ASICs), programmable logic devices (PLDs), or the like, or a combination of such devices.

Memory 322 comprises storage locations that are addressable by the processor 321 and adapters for storing software program code and data structures associated with the present invention. The processor 321 and adapters may, in turn, comprise processing elements and/or logic circuitry configured to execute the software code and manipulate various data structures. Memory 322 can be a random access memory (RAM), a read-only memory (ROM), a flash memory, or the like, or a combination of such devices. Memory 322 stores, among other components, the storage operating system 324 of the storage server 200. It will be apparent to those skilled in the art that other processing and memory means, including various computer readable media, may be used for storing and executing program instructions pertaining to the invention described herein. Memory 322 also stores configuration information (also referred to herein as "labels") of the disk drives.

In one implementation, memory 322 also stores a mask of each drive. In one embodiment, a mask is written to a checksum block associated with a data block that stores parity for a drive. This mask is referred to herein as a parity mask and is computed as a result of a logical operation on the masks of each disk drive storing data blocks included in the parity for a stripe where new data blocks are written. Thus, the mask that is written in the checksum block associated with a data block that stores parity for the stripe can be used to determine which data blocks are included in the parity for a particular stripe. A mask for each disk drive can be created by shifting a one bit by the position of the drive in the array. In one embodiment, a mask is a bitmask. For example, drive 0 would be assigned a binary mask of "0001b", while drive 1 would be assigned a binary mask of "0010b" (a one bit shifted left by one bit), drive 2 would be assigned the mask of "0100b" (a one bit shifted left by two bits). A parity mask, such as for example, a mask of "0101b" would indicate that the parity block includes the data for drives 0 and 2 ("0101b" is the result of logically OR'ing the mask of drive 0, "0001b", and the mask of drive 2, "0100b"). During a write operation, a parity mask is updated and written to a checksum block, which is associated with the parity block.

A person of ordinary skill in the art would understand that although the present invention is described in the context of using a mask to represent the data blocks of a stripe that are included in the parity for that stripe, other representations can be used, such as storing each drives' position in the RAID group. In this embodiment, a disk drive that stores parity for a stripe stores an array of values, each value representing the position of a drive storing data blocks included in the parity for that stripe. For example, a 16-element array can represent up to 16 disk drives in the disk array. When using a mask to represent the data blocks of a stripe that are included in the parity for that stripe, a 16-bit value can represent up to 16 disk drives in the disk array.

A portion of the memory 322 may be further organized as a "buffer cache" 350 for storing certain data structures as well as data blocks retrieved from disks 250 and to be written to the disks 250. A data block stored in buffer cache 350 is appended with a checksum block, which could store up to 64 bytes of data. As described herein, the checksum block stores a unique disk drive ID, which is inserted prior to the data block being written to the disk, to indicate that the data block was written after the disk was added to the existing array. In addition, the checksum block may store a checksum for the associated data block, which can be computed by combining all the bytes for a block (e.g., 4 Kb) with a series of arithmetic or logical operations.

Also connected to the processor(s) 321 through the bus system 323 are a storage adapter 326 and a network adapter 327. The storage adapter 326 cooperates with the storage operating system 324 executing on the storage server 200 to access data from disks 250. The storage adapter 326 comprises a plurality of ports having input/output (I/O) interface circuitry that couples to the disks 250 (shown in FIG. 2) over an I/O interconnect arrangement, such as a conventional high-performance, fibre channel (FC) link topology.

The network adapter 327 comprises a plurality of ports adapted to couple the storage server 200 to one or more clients 210 (shown in FIG. 2) over point-to-point links, wide area networks, virtual private networks implemented over a public network (Internet) or a shared local area network. The network adapter 327 thus may comprise the mechanical, electrical and signaling circuitry needed to connect the node to the network.

2. Storage Operating System

Figure 4:
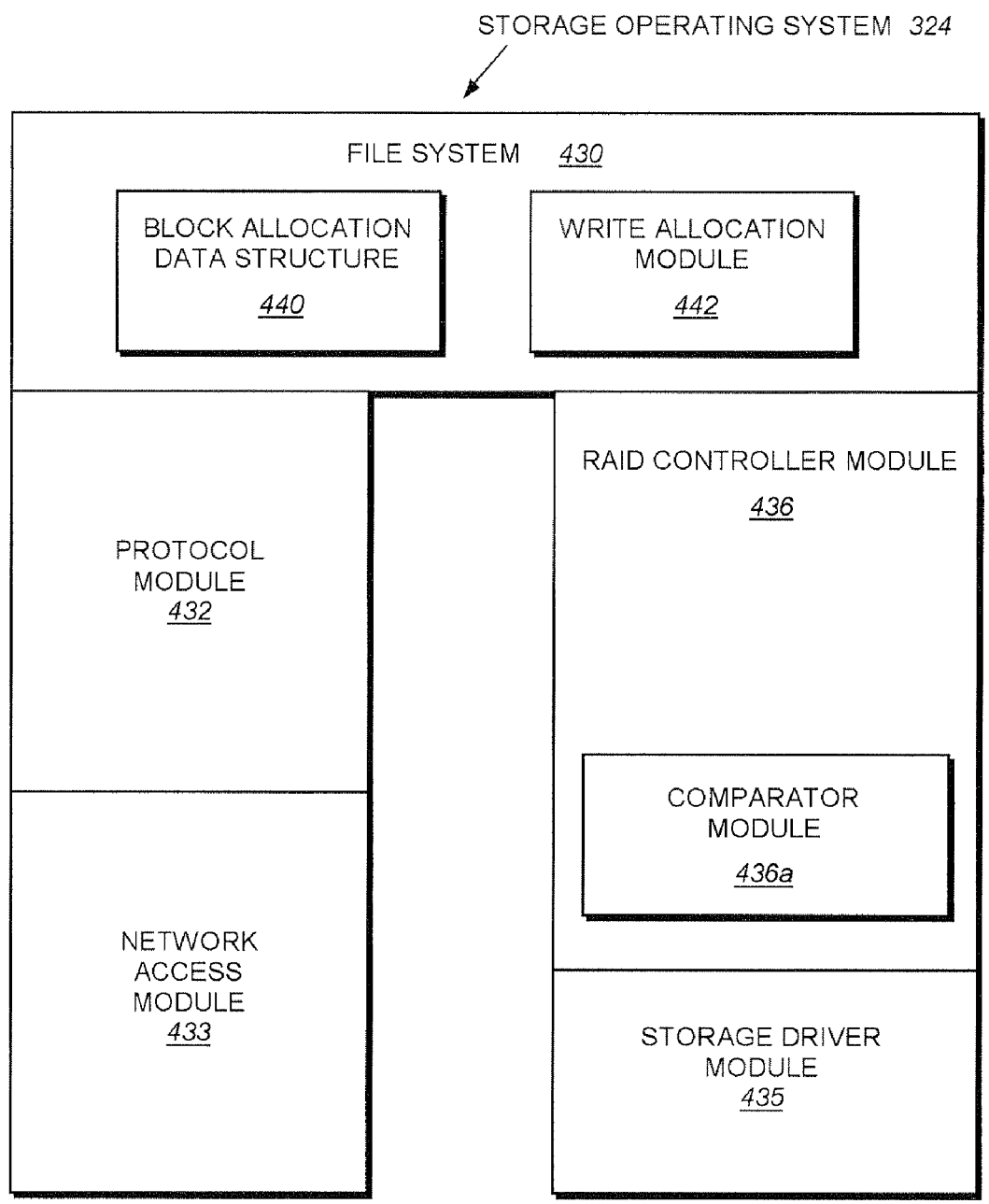
FIG. 4 is a diagram showing a storage operating system of the storage server of FIG. 2 according to an embodiment of the present invention.

FIG. 4 shows an example of the storage operating system 324 of the storage server 200. In the illustrative embodiment, the storage operating system 324 can be the NetApp® Data ONTAP® storage operating system available from Network Appliance Inc., of Sunnyvale, Calif., that implements a Write Anywhere File Layout (WAFL®) file system. However, it is expressly contemplated that any appropriate storage operating system may be employed for use in accordance with the inventive principles described herein. As used herein, the term "storage operating system" generally refers to the computer-executable code operable on a computer to perform a storage function that manages data access. The storage operating system 324 can also be implemented as a microkernel, an application program operating over a general-purpose operating system, such as UNIX® or Windows NT®, or as a general-purpose storage operating system with configurable functionality, which is configured for storage applications as described herein.

To facilitate access to the disks 250, the storage operating system 324 implements a file system 430. The file system 430 logically organizes the information as a hierarchical structure of named directories and files on the disks. In one embodiment, the file system 430 is a write-anywhere file system that "virtualizes" the storage space provided by the disks 250. Each file may be implemented as a set of data blocks configured to store information, such as data, whereas a directory may be implemented as a specially formatted file in which names and links to other files and directories are stored.

Storage operating system 324 further includes a protocol module 432, a network access module 433, a RAID controller module 436, and a storage driver module 435.

The protocol module 432 implements one or more of various high-level network protocols, such as Network File System (NFS), Common Internet File System (CIFS), Hypertext Transfer Protocol (HTTP) and/or Transmission Control Protocol/Internet Protocol (TCP/IP) to decode incoming client requests or encode outgoing responses to the client request in the appropriate protocol. The network access module 433 includes one or more drivers, which implement one or more lower-level protocols to communicate over the network, such as Ethernet. The protocol module 432 and the associated network access module 433 allow the storage server 200 to communicate over the communication system 230 (e.g., with clients 210), as shown in FIG. 2.

RAID controller module 436 (also referred to herein as a "storage module") manages storage devices, such as disks, in a RAID system comprising one or more RAID groups. RAID controller module 436 manages data storage and retrieval in response to access requests from clients 210, which may include requests to write data and/or to read data. In one embodiment, RAID controller module 436 can be a software module implemented on the storage server 200. In an alternative embodiment, RAID controller module 436 can be a separate enclosure implemented as hardware with its own controller or a processor, separate from, though in communication, with those that execute file system 430. RAID controller module 436 issues internal I/O commands to disks 250, in response to client requests. These commands can be a command to write data at a physical block number at disk 250 or a command to read data from a physical block number at disk 250.

According to an embodiment of the present invention, when RAID controller module 436 receives a request to perform a write operation, the RAID controller module 436 is configured to insert (in memory), into a checksum block of the data block indicated in the request, a unique ID of a disk drive where the data block will be written. Storage adapters, such as for example, storage adapter 326 (shown in FIG. 3), transfer the data block(s) and the unique disk drive ID to the disk.

RAID controller module 436 includes a comparator module 436a. Comparator module 436a is configured to compare the disk drive ID stored in memory (which was stored in the configuration area) and a disk drive ID from the checksum block. If the two match, it indicates that data were written to the read data block after the disk was added to the array. If the two do not match, the data block was written prior to the disk being added to the array or the data block has become free and is removed from the parity block.

A person of ordinary skill in the art would understand that other techniques can be used to determine whether the data blocks are invalid, and that using the unique disk drive ID is just one exemplary embodiment to implement the present invention.

Storage driver module 435 allows storage server 200 to communicate with the disks 250. The storage driver module 435 implements a lower-level storage device access protocol, such as Fibre Channel (FC) protocol, Small Computer Systems Interface (SCSI) protocol, Serial ATA (SATA), or Serial Attached SCSI (SAS).

Methods of Operation

Figure 5:
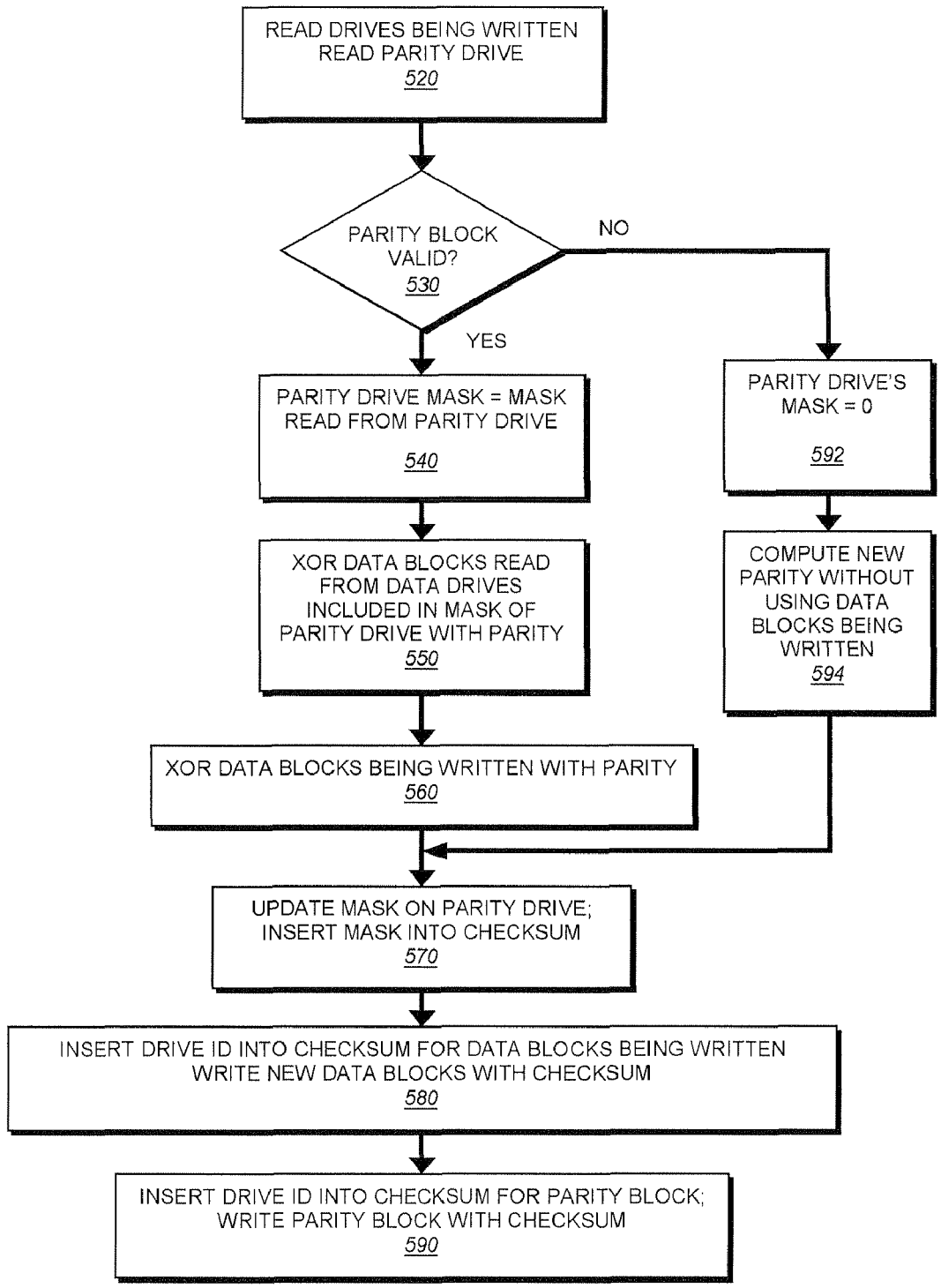
FIG. 5 is a flow diagram of a method for using disk drives to perform a write operation according to a subtraction method without zeroing disk drives prior to using them according to one embodiment of the present invention.

Referring now to FIG. 5, it illustrates a flow diagram of the steps to perform a write operation while eliminating the need to zero disk drives prior to using the disk drives. A person of ordinary skill in the art would understand that the steps described below do not need to be executed in the described order except where expressly required.

Initially, when a disk drive is added to a RAID group, RAID controller module 436 creates a unique disk drive ID for that disk drive. As described herein, in one implementation, a unique disk drive ID can be created using a unique RAID group ID and a count of the number of disks already added to the RAID group. A person of ordinary skill in the art would understand that other mechanisms could be used to create a unique disk drive ID. The unique disk drive ID is different for each disk drive. RAID controller module 436 then stores the unique disk drive ID in the configuration area on the disk.

Storage server 200 receives a write request from client 210 to modify a data block(s) in a RAID array. Storage server 200 passes the request to the file system 430. File system 430 identifies a logical block number(s) at which new data blocks will be written and sends a request to RAID controller module 436 to write the data blocks to the disk at the logical block number. The request includes a pointer to buffer cache 350 that stores data to be written, a disk drive number, and a block number on the disk where data is to be written.

RAID controller module 436 determines whether the parity mask for a stripe is stored in memory 322. If the parity mask is not stored in memory, RAID controller module 436 determines whether to use a subtraction method or a recalculation method to perform a write operation without using the parity mask of the stripe. The determination of which method to use is made by determining the number of read requests required for each method. If the recalculation method would require fewer reads, then it is used. Otherwise, the subtraction method is used.

1. Read Modify Write (Subtraction) Method

In summary, when a subtraction method is used to perform a write operation, the present invention advantageously eliminates the need to zero disk drives or otherwise to recompute the parity by providing an indication whether any of the data blocks that will be modified are invalid (e.g., they were written prior to creating a RAID group or being added to the RAID group or the data blocks have become free and were removed from the parity block). If the data blocks that will be modified are invalid, they can be ignored and not used for parity computation, as if they were zeroed.

If the subtraction method is used, RAID controller module 436 reads, into memory 322, data blocks to which data will be overwritten as well as a parity block for that stripe (at step 520). At step 530, RAID controller module 436 determines whether the parity block is valid. The parity block is valid if it was written after the RAID group was created and the parity mask stored in the checksum block is not "0" and thus includes at least one data block for that stripe. In one implementation, to determine whether the parity block was written after the RAID group was created, comparator module 436a compares the unique disk drive ID stored in the checksum block associated with the parity block with the unique disk drive ID kept in memory for the disk that stores parity. If the two match, it indicates that the parity block was written after the disk was added to the array, and thus stores valid data. Currently, the parity mask is equal to the mask read from the drive that stores parity for a stripe (step 540). This mask will be used to determine which data blocks in a stripe are included in the parity block for the stripe where new data will be written.

At step 550, data blocks from the disk drives which were read and which are included in the parity mask are XOR'ed with the parity block. To determine which disk drives are included in the parity mask for a stripe, the following algorithm can be used. RAID controller module 436 performs:

1. A logical AND operation on the mask of a disk drive to which data will be written and the parity mask;
2. If a result of a logical AND operation contains a logical bit "1", it indicates that data from that drive are included in the parity block in the stripe. For example, if the mask of drive 0="0001b" and the parity mask read from the drive that stores parity for a stripe="0011b" then the AND operation on the two masks will produce the following result: "0001b." Since the result of the logical operation contains a logical bit "1", a data block on drive 0 is included in a parity block on the drive that stores parity for a stripe in the stripe.
3. Otherwise, if a result of a logical AND operation does not contain a logical bit "1", it indicates that data from that drive are not included in the parity block in the stripe.

A person of ordinary skill in the art would understand that the above-described steps to determine whether a disk drive is included in the parity mask is just an exemplary way of implementing the present invention and other techniques that produce a similar result can be used.

Once it is determined which disk drives that are being overwritten are included in the parity mask, new parity is computed by XOR'ing the following: 1. Old data blocks that are being overwritten and are included in the parity block, 2. The parity block, and 3. New data blocks.

If at step 530 it is determined that the parity block for the stripe where data blocks will be modified is not valid (i.e., the unique drive ID stored in the configuration area for the drive that stores parity for a stripe does not match to the corresponding data stored in the checksum block associated with the parity block), it indicates that the parity block was written prior to the disk drive being added to the existing array and no data blocks in that stripe are included in the parity block. If no data blocks in the stripe are included in the parity block, these data blocks are invalid and can be ignored for purposes of parity computation. At step 592, RAID controller module 436 assigns a zero value to the parity mask for a stripe.

At step 594, RAID controller module 436 computes new parity without using old data blocks that are being overwritten since these data blocks are invalid. In one implementation, the new parity is computed by XOR'ing new data to compute a new parity block. Thus, the present invention eliminates the need to use invalid data blocks to compute parity even without zeroing the invalid data blocks.

If the parity block is valid, a logical operation is performed on the new data blocks, old data blocks that are being read which are included in the parity, and old parity within the stripe (steps 550 and 560).

Once new parity has been computed for the stripe, at step 570, RAID controller module 436 updates a parity mask for a stripe. The parity mask for a stripe is a result of a logical operation of masks of disk drives storing data blocks included in a parity block for that stripe. If none of the data blocks in a stripe to which new data are written were included in the parity block for that stripe, then parity mask was equal to zero before the new write operation. In one implementation, the parity mask is updated by performing a logical OR operation on the masks of disk drives where new data will be written. The mask of each data drive being written is logically OR'ed to the parity mask to produce a new parity mask. The new parity mask is inserted into a checksum block associated with the computed parity block.

According to an embodiment of the present invention, the updated parity mask may be cached in memory 322 in buffer cache 350. On a subsequent write request, the cached parity mask can be used to determine which data blocks are valid without reading the data blocks or a parity block. This embodiment is described herein in reference to FIGS. 7A and 7B.

At step 580, RAID controller module 436 inserts, into a checksum block associated with a data block that will be written to a disk, a unique disk drive ID of that disk. Storage adapter 326 transfers the data block along with the unique disk drive ID from buffer cache 350 to the disk 250. Comparator module 436a later compares the unique disk drive ID with the unique disk drive ID, which was stored in the configuration area on the disk and is kept in memory, to determine whether the data block is valid.

At step 590, RAID controller module 436 inserts, into a checksum block associated with the computed parity block, a unique disk drive ID of the drive that stores parity for a stripe where the parity block will be written along with the new parity mask for a stripe. Storage adapter 326 transfers the parity block along with the unique disk drive ID and the parity mask from buffer cache 350 onto the parity disk 250.

2. Recalculation Write (Recalculation Method)

Assume that storage server 200 receives a request to modify a number of data blocks in a RAID array. If the number of data blocks in a stripe being overwritten plus one is greater than the number of data blocks in the stripe not being overwritten, RAID controller module 436 uses a recalculation method to perform a write operation. Briefly, according to this method, data blocks that are not being overwritten are read into memory and XOR'ed with an XOR of new data blocks. The result of the XOR operation is written to a parity block for that stripe.

Figure 6:
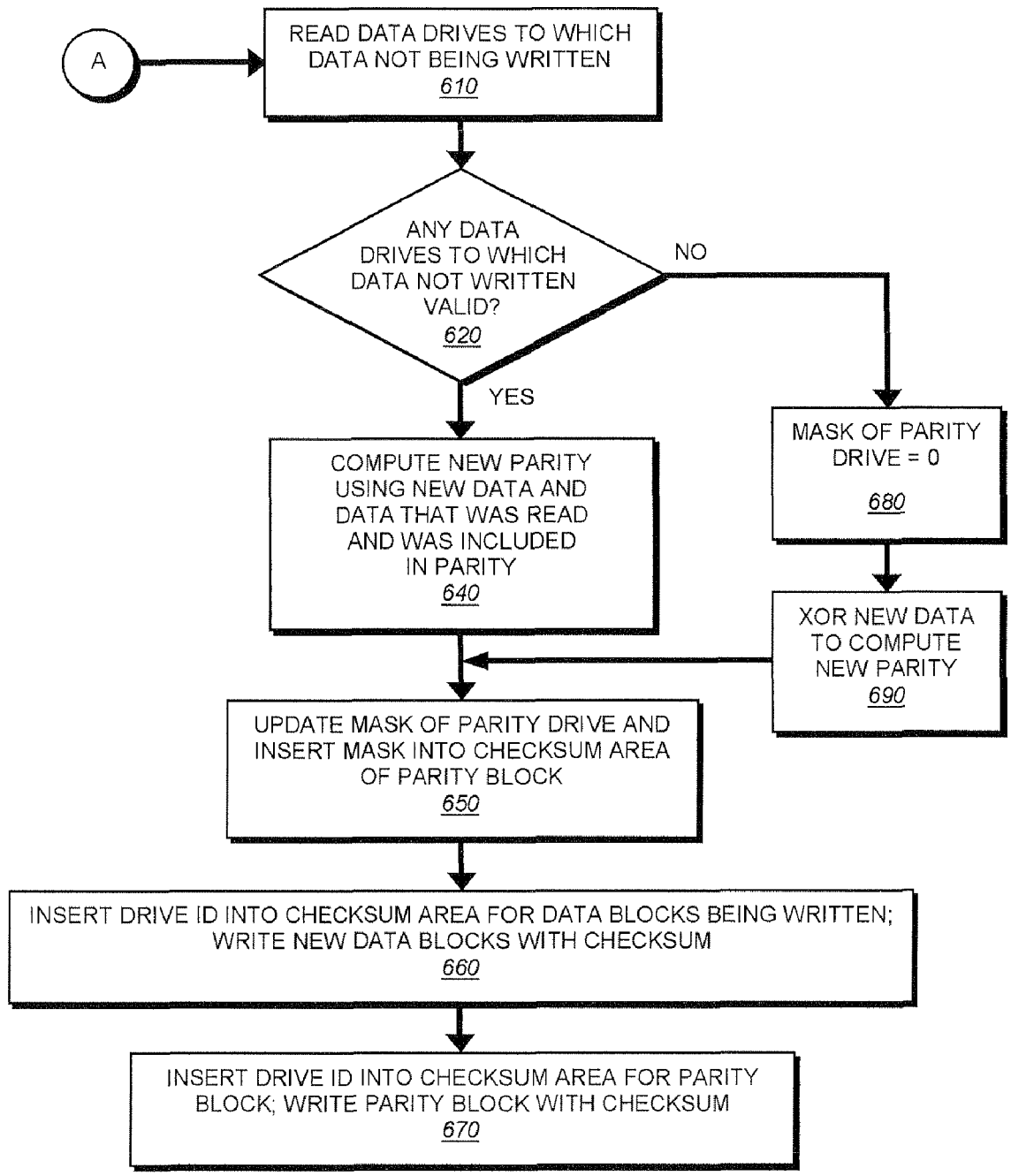
FIG. 6 is a flow diagram of a method for using disk drives to perform a write operation according to a recalculation method without zeroing disk drives prior to using them according to one embodiment of the present invention.

Referring now to FIG. 6, it illustrates a flow diagram of a method for using disk drives to perform a write operation according to a recalculation method without zeroing disk drives prior to using them according to one embodiment of the present invention.

In summary, when a recalculation method is used to perform a write operation, the present invention advantageously eliminates the need to zero disk drives or otherwise to recompute the parity by determining whether any of the data blocks that will not be modified are valid. Invalid data blocks can be ignored and not used for parity computation as if they were zeroed.

At step 610, RAID controller module 436 reads into memory 322 data blocks to which data are not to be written. At step 620, RAID controller module 436 determines whether any data blocks to which data are not to be written are valid. In one implementation, to determine whether a data block is valid, RAID controller module 436 reads a unique disk drive ID in the checksum block associated with the data block. Comparator module 436a compares the unique disk drive ID in the checksum block with the unique disk drive ID which was stored in the configuration area for that disk drive and is kept in memory. If the two match, it indicates that the data block is included in the parity block for that stripe and the data block was written after the disk drive was added to the disk array.

Optionally, RAID controller module 436 may check whether the parity block includes a data block(s) to which new data are not to be written. To this end, RAID controller module 436 may perform the following steps:

Reads the parity block along with the associated checksum block from the drive storing parity for the stripe in addition to reading the data blocks and associated checksum blocks from the data drives which are not being written.

Performs a logical AND operation on the mask of each disk drive to which data will not be written and the parity mask read from the drive that stores parity for a stripe;

If a result of the logical AND operation contains a logical bit "1", it indicates that for the stripe where new data will be written the data block from that drive is included in the parity block.

At step 640, parity is updated for the stripe where data blocks are modified. To this end, RAID controller module 436 performs a logical XOR operation on new data blocks and the data blocks read into memory that are valid and thus were included in parity. A person of ordinary skill in the art would understand that other techniques that produce a similar result can be used to update the parity.

If at step 620, in the stripe where data blocks are modified, all data blocks are invalid, it indicates that these data blocks were written prior to creating a RAID group or prior to adding the disks to the RAID group or these data blocks have become free (unallocated) and were removed from the parity block in the stripe. Therefore, these data blocks can be ignored for purposes of parity computation. At step 680, RAID controller module 436 assigns a zero value to the parity mask for the stripe. RAID controller module 436 computes new parity without using invalid data blocks that will be modified (step 690). In one implementation, RAID controller module 436 computes parity by XOR'ing new data.

At step 650, RAID controller module 436 updates the current mask of the parity mask. The current mask is a result of the logical operation performed on the mask of the disk drives that store data blocks included into the parity. If none of the data blocks are included in the parity block for the stripe where new data are written, the parity mask is assigned a zero value. In one implementation, to update the current mask, the current mask of the parity mask for a stripe is logically OR'ed with the masks of disk drives to which new data will be written. The result may be first written onto a checksum block associated with the parity block in buffer cache 350.

At step 660, RAID controller module 436 inserts, into a checksum block associated with a data block that will be written to a disk, a unique disk drive ID for that disk. Storage adapter 326 transfers the data block along with the unique disk drive ID from buffer cache 350 to the disk 250. The unique disk drive ID will be later compared by comparator module 436a with the unique disk drive ID stored in the configuration area for that disk and kept in memory At step 670, RAID controller module 436 inserts, a unique disk drive ID of the drive that stores parity for a stripe, into a checksum block associated with the computed parity block that will be written to the drive that stores parity for a stripe. Storage adapter 326 transfers the parity block along with the unique disk drive ID and the parity mask from buffer cache 350 to the drive that stores parity 250.

Thus, the present invention eliminates the need to use invalid data blocks to compute parity without zeroing those data blocks by providing an indication that a data block is invalid. The inventive technique for using disk drives in RAID arrays without zeroing the drives prior to using the arrays can be used to optimize write operations, to do faster data reconstruction, to recover a media error, and to do faster disk copies, as described in greater detail herein.

Optimizing Write Operations Using Cached Parity Mask

The inventive technique of the present invention can be used to reduce or eliminate read operations when performing a write operation. For example, if the parity mask for a stripe is cached in memory, it can be used to decide whether data blocks in a stripe where new data are written are valid even without reading those data blocks.

Figure 7A:
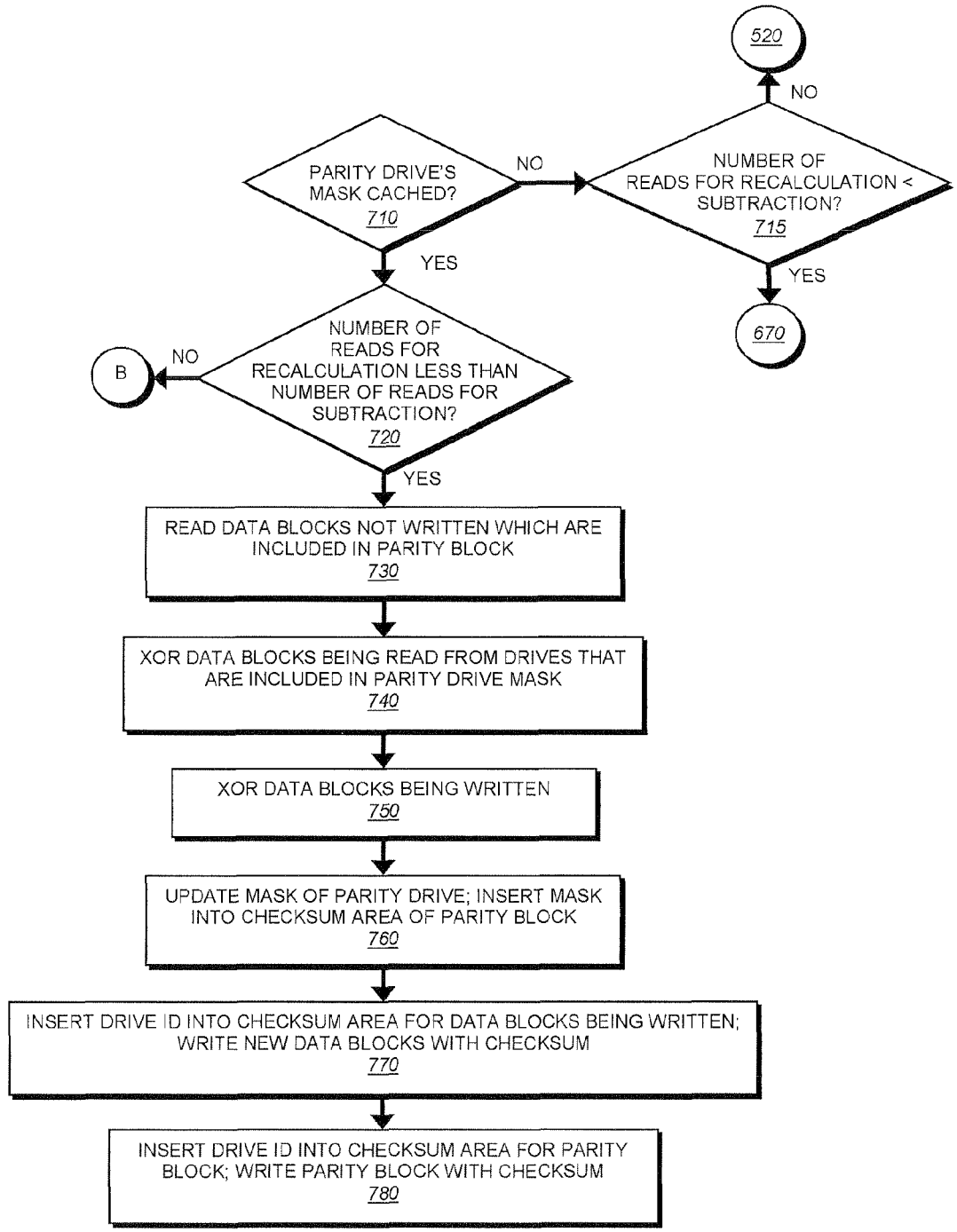
FIG. 7A is a flow diagram of a method for optimizing write operations using inventive techniques of the present invention according to one embodiment of the present invention.

Referring now to FIG. 7A, it illustrates a flow diagram of a method for optimizing write operations using inventive techniques of the present invention according to one embodiment of the present invention.

Initially, at step 710, a determination is made whether the parity mask for the stripe is cached in memory 322. If the mask is not cached in memory 322, a determination is made whether the number of read operations that need to be performed using a subtraction method exceeds the number of read operations that need to be performed using a recalculation method (step 715). If so, the write operation is performed using a recalculation method as described in FIG. 6. Alternatively, if the number of read operations needed to be performed using a recalculation method is equal to or exceeds the number of read operations needed to be performed using the subtraction method, the write operation is performed using a subtraction method, as described in FIG. 5.

If the parity mask is cached in memory 322, the parity mask can be used to determine which data blocks are valid, e.g., included into a parity block in a stripe where new data will be written. This information will be used to eliminate the need to read invalid data blocks to perform a write operation.

At step 720, a determination is made whether the number of read operations that would have to be performed using a recalculation method is less than the number of read operations that would have to be performed using a subtraction method. To this end, the cached parity mask for the stripe is used to determine data blocks from which drives are included in the parity for the stripe. In one implementation, the following steps can be performed by RAID controller module 436:

Logical AND operation on the mask of each disk drive and the parity mask for the stripe;

If a result of the logical AND operation on the mask of the drive that will be written and the parity mask for the stripe does not contain a logical bit "1", it indicates that data from that drive are not included in the parity block and thus would not have to be read if a subtraction method is used;

If a result of the logical AND operation of the mask of a disk drive that will not be written and the parity mask for the stripe does not contain a logical bit "1", it indicates that data from that drive are not included in the parity and thus will not have to be read if a recalculation method is used;

RAID controller module 436 uses this information to determine a number of read operations that need to be performed by a subtraction method or a recalculation method to perform a write operation. It at step 720, the number of read operations for a recalculation method is greater than or equal to the number of read operations for a subtraction method, then the write operation is performed using a subtraction method (as described in reference to FIG. 7B). Alternatively, the write operation is performed using a recalculation method.

To this end, at step 730, data blocks that meet the following two requirements are read into memory 322: (1) data blocks that are included in a parity block for the stripe where new data are written; and (2) data blocks to which new data are not to be written. Data blocks that are not included in the parity block are not read since they are invalid and can be ignored for parity computation.

At step 740, data blocks that were read are logically XOR'ed. At step 750, new data blocks are logically XOR'ed in memory. To compute new parity, the result of the XOR operation is XOR'ed with the result of the logical operation at step 740.

At step 760, the parity mask for the stripe is updated. In one implementation, the mask is updated by being OR'ed with the masks of the drives where new data are written. The mask is written into a checksum block associated with the computed parity block.

At step 770, RAID controller module 436 inserts, into a checksum block associated with the data block stored in buffer cache 350 that will be written to a disk, a unique disk drive ID for that disk. Storage adapter 326 transfers the data block along with the unique disk drive ID from buffer cache 350 onto the disk 250. The unique disk drive ID will be later compared by comparator module 436a with the unique disk drive ID kept in memory that is stored in the configuration area on the disk.

At step 780, RAID controller module 436 inserts, into a checksum block associated with the computed parity block a unique disk drive ID for the drive that stores parity for the stripe where the parity block will be written. Storage adapter 326 transfers the parity block along with the unique disk drive ID and the parity mask from buffer cache 350 onto the parity disk 250.

Thus, since invalid data blocks are not read to compute parity, the optimization technique of the present invention may eliminate or reduce the number of read operations to complete a write operation.

Figure 7B:
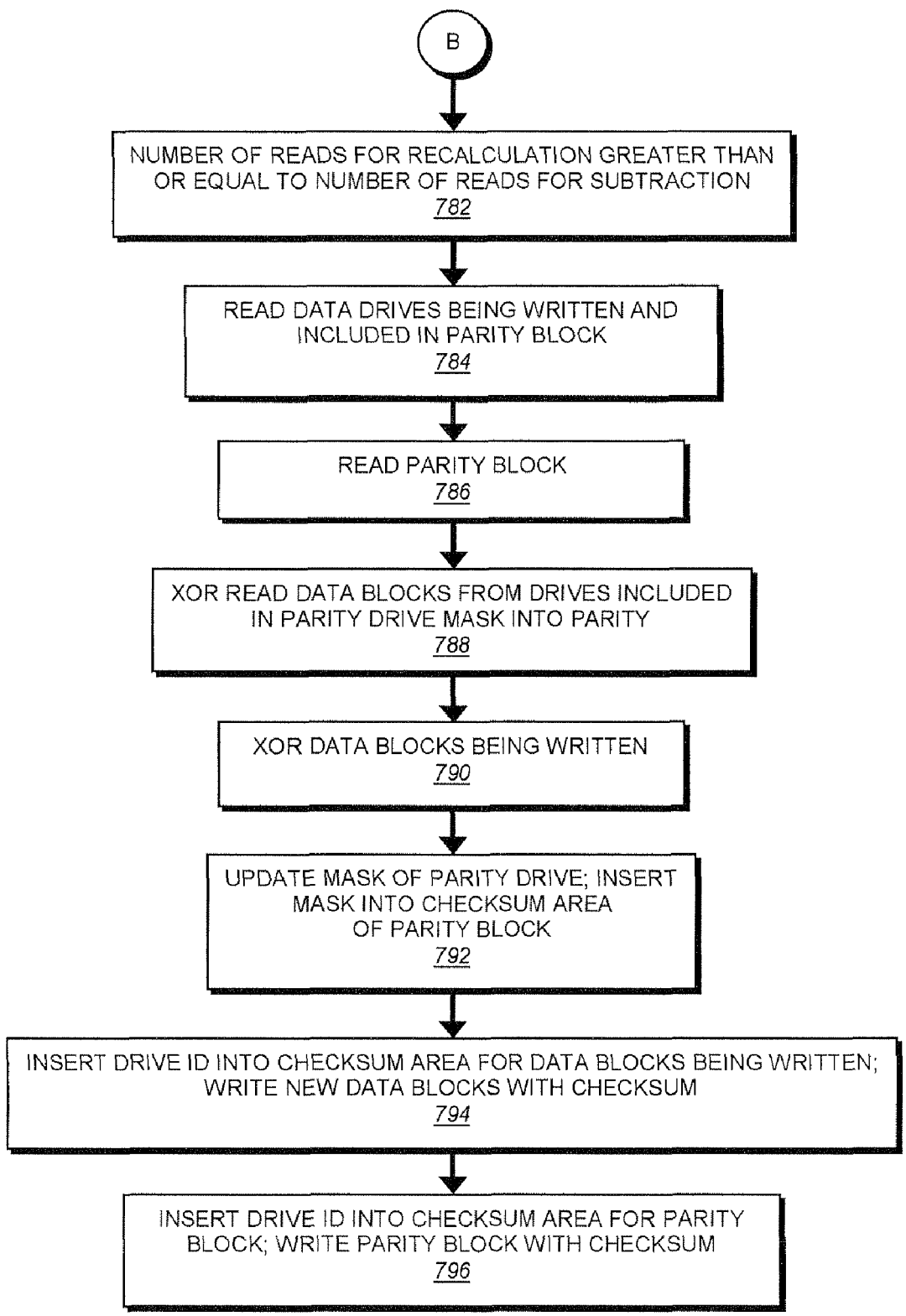
FIG. 7B is a flow diagram of a method for optimizing write operations using inventive techniques of the present invention according to another embodiment of the present invention.

Referring now to FIG. 7B, it illustrates a flow diagram of a method for optimizing write operations using inventive techniques of the present invention according to another embodiment of the present invention. According to this embodiment, the write operation is performed using a subtraction method since the number of read operations to be performed using the recalculation method is greater than the number of read operations to be performed using the subtraction method (step 782).

As described herein, when a parity mask for a stripe is cached in memory 322, it can be used to determine which data blocks are valid in a stripe where new data are written.

At step 784, RAID controller module 436 reads into memory 322 data blocks that meet the following two criteria: (1) data blocks that are being overwritten; and (2) included in a parity block in the stripe where new data are written. Data blocks that are not included in the parity block do not need to be read and can be ignored for parity computation.

At step 786, a parity block for the stripe where new data will be written is read into memory. Then data blocks that are read into the memory are logically XOR'ed, at step 788. At step 790 new data blocks are XOR'ed in memory. To compute new parity, the result of the XOR operation in step 790 is XOR'ed with the result of the operation in step 788.

At step 792, the parity mask for the stripe is updated. In one implementation, the parity mask is OR'ed with the masks of the drives where new data will be written in the stripe. The mask is written into a checksum block associated with the computed parity block.

At step 794, RAID controller module 436 inserts, into a checksum block associated with the data block that will be written to a disk drive, a unique disk drive ID for that disk. Storage adapter 326 transfers the data block along with the unique disk drive ID from buffer cache 350 to the disk 250. The unique disk drive ID will be later compared by comparator module 436a with the unique disk drive ID kept in memory that is stored in the configuration area on the disk.

At step 796, RAID controller module 436 inserts, into a checksum block associated with the computed parity block a unique disk drive ID for the drive that stores parity for a stripe where the parity block will be written. Storage adapter 326 transfers the parity block along with the unique disk drive ID and the parity mask for the stripe from buffer cache 350 onto the parity disk 250.

Thus, this embodiment eliminates the need to read invalid data blocks to compute parity. This, in turn, reduces the number of read operations to perform a write operation.

Optimizing Write Operations Using Modified XPWrite Command

According to yet another optimization technique, a write operation can be performed by eliminating read operations if none of the data blocks being overwritten are valid (i.e., their unique disk drive ID does not compare to the unique disk drive ID which was stored in the configuration information for the respective disk drives) but some other data blocks in the stripe not being overwritten are valid. To implement this embodiment, RAID controller module 436 issues a command to a disk drive that stores parity. In one embodiment, the command is a modified XPWrite command. XPWrite command is provided by SCSI standard, described in SCSI Block Commands, second generation, published draft of Sep. 22, 2006 from the T10 Technical Committee (see www.t10.org). XPWrite command includes a logical block address (LBA) of the block where to write data as well as a number of blocks for writing the data. As will be described below, XPWrite command is modified so that data stored in the checksum block associated with the new data block is not XOR'ed with the parity block. Rather, it is written directly to the parity block. Although the present invention is described in the context of the modified XPWrite command, a person of ordinary skill in the art would understand that any command that produces a same result can be used.

Figure 9:
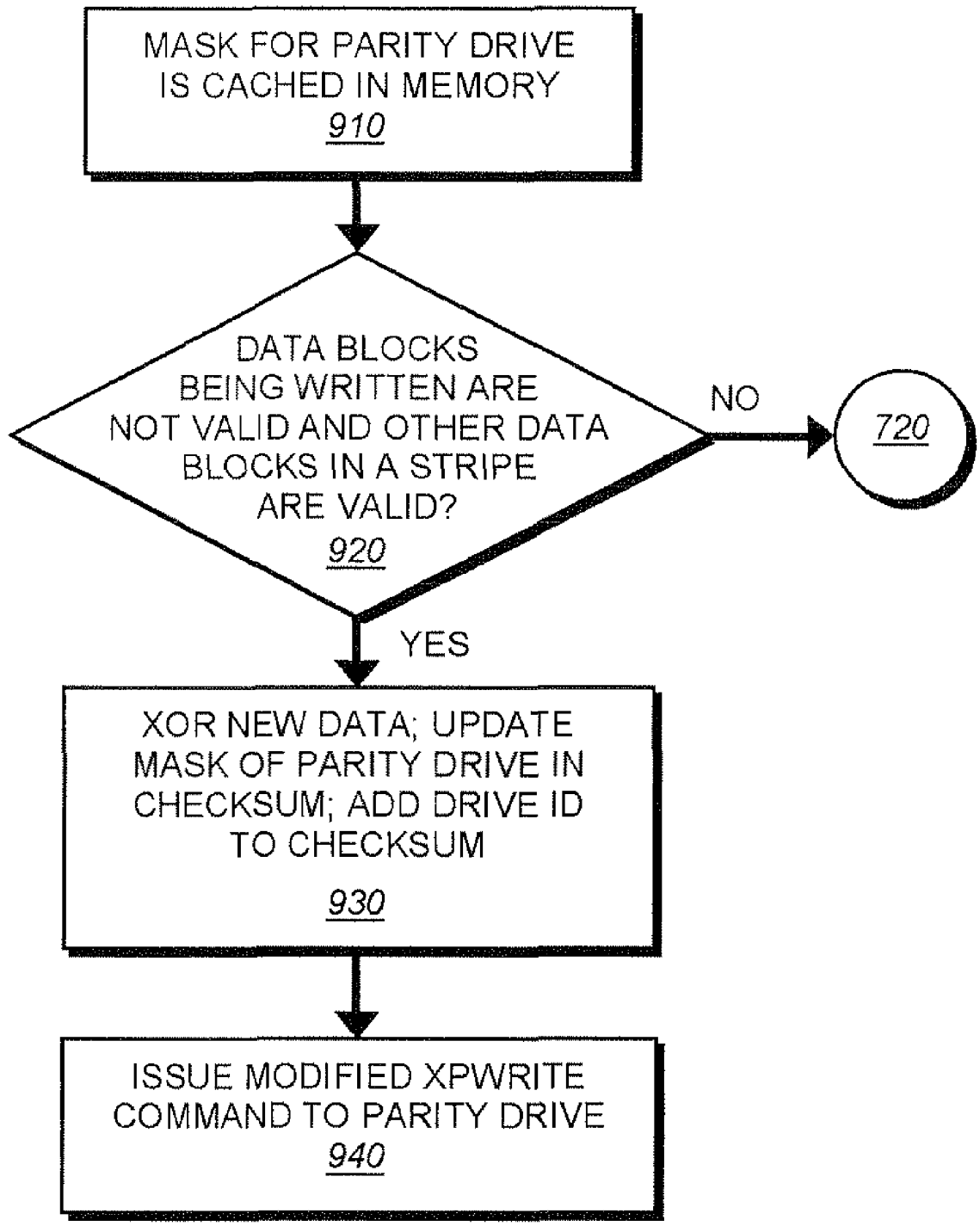
FIG. 9 is a flow diagram of a method for optimizing write operations using inventive techniques of the present invention and a modified XPWrite command according to one embodiment of the present invention.

Referring now to FIG. 9, it illustrates a flow diagram of a method for optimizing write operations using a modified XPWrite command according to one embodiment of the present invention.

Initially, at step 910, it was determined that the parity mask for the stripe is cached in memory 322. The parity mask is used to determine which data blocks are valid (e.g., included in the parity block for the stripe where new data are to be written). At step 920, a determination is made whether data blocks that will be modified are not valid and some other data blocks in a stripe are valid. In one embodiment, the determination is made by performing a logical AND operation on the mask of each data drive and the parity mask for the stripe. If a result of the logical operation does not contain a logical "1", it indicates that a data block is not included in the parity, and thus does not need to be read for purposes of parity computation. If any of the data blocks that are being overwritten in the stripe are valid, or all of the data blocks in the stripe not being overwritten are invalid, the write operation is performed according to the steps recited in FIG. 7A.

At step 930, new data blocks are XOR'ed in memory 322. RAID controller module 436 inserts a unique disk drive ID of the drive that stores parity for the stripe. Module 436 inserts the parity mask for the stripe into the checksum block associated with the parity block. The parity mask is updated to include the masks of drives being written. RAID controller module 436 then issues a modified XPWrite command to the disk that stores parity (step 940). RAID controller module 436 writes, to the data drives, the new data blocks along with the checksum block, which includes the unique drive ID.

Figure 10:
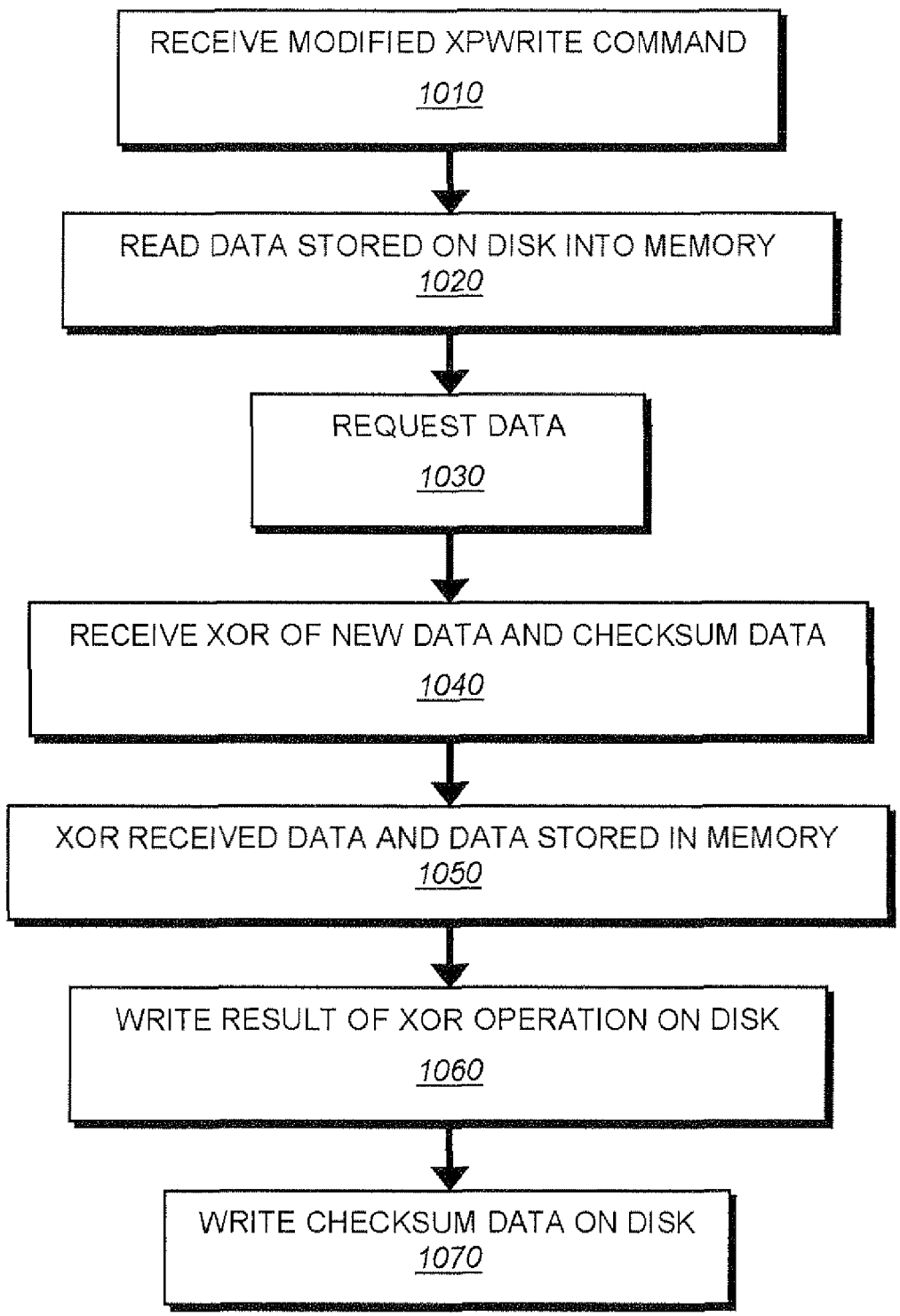
FIG. 10 is a flow diagram of a method performed by a module executed on a drive that stores parity for a stripe to execute a modified XPWrite command according to an embodiment of the present invention.
Figure 11:
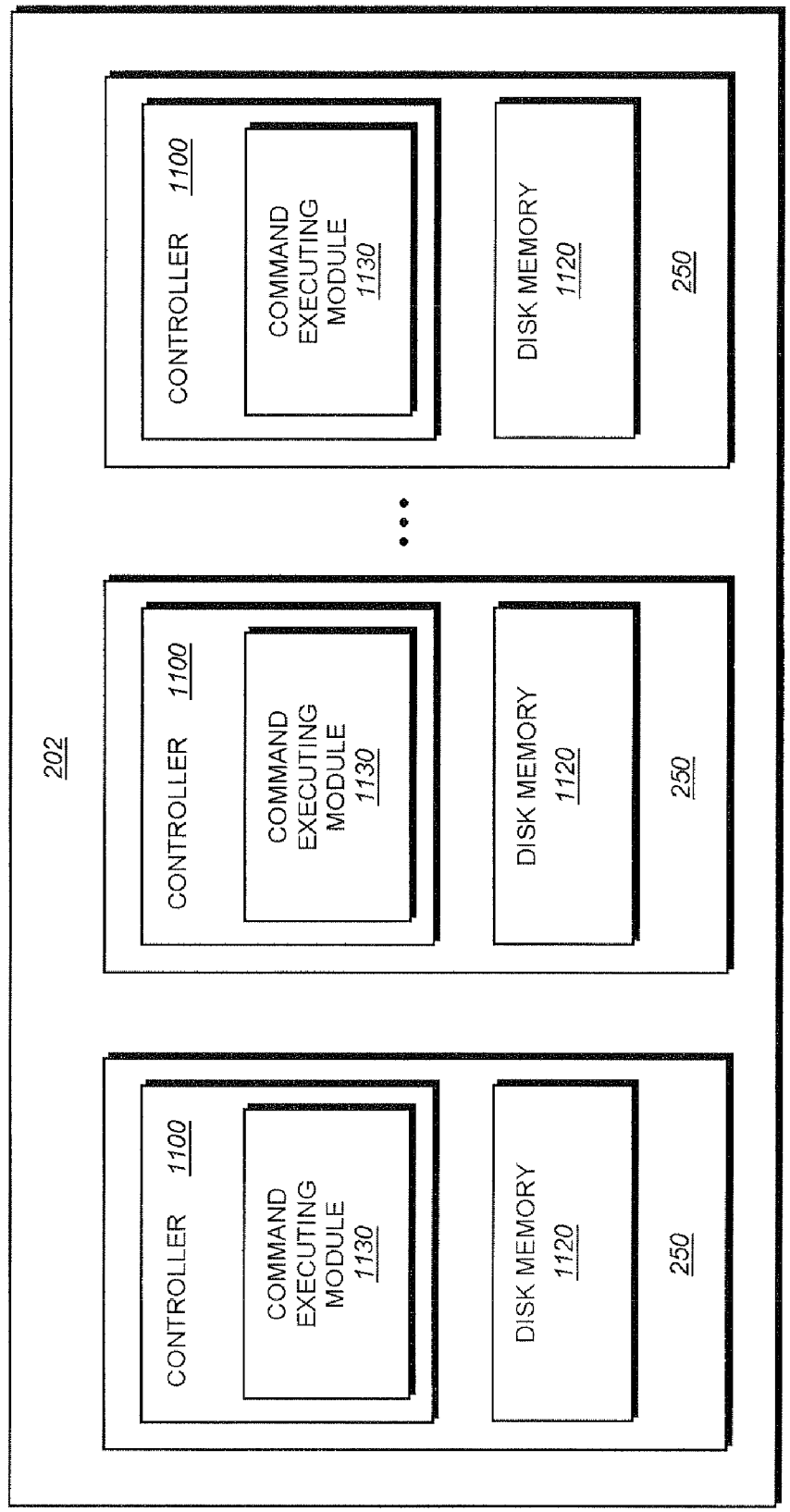
FIG. 11 is a block diagram of the components of a disk configured to perform a write operation using a modified XPWrite command according to one embodiment of the present invention.

Referring now to FIG. 11, it illustrates components residing on each disk 250 in a RAID group, such as RAID group 202 shown in FIG. 2, to execute a modified XPWrite command issued by RAID controller module 436. Each disk 250 in a RAID group 202 includes a controller 1100, which implements a command executing module 1130. In response to receiving a modified XPWrite command, command executing module 1130 is configured to read data from the data block indicated in the command and to request new data from storage system 200. Module 1130 also receives the XOR of new data blocks and computes new parity by XOR'ing the new data blocks with the data read in memory. Steps performed by module 1130 will be described in more detail in reference to FIG. 10. In a preferred embodiment, command executing module 1130 is implemented as firmware embedded into a hardware device, such as controller 1100. In another embodiment, command executing module 1130 can be implemented as software stored in the disk memory 1120. In another embodiment, command executing module 1130 may reside in a controller between storage server 200 and the disk drive. The command executing module 1130 does not need to reside in the disk drive.

Referring to FIG. 10, it illustrates the steps performed by command executing module 1130 at the parity disk to execute a modified XPWrite command issued by RAID controller module 436 at the storage server 200.

At step 1010, command executing module 1130 receives the command issued by RAID controller module 436. The command includes a block number at which data will be written as well as the number of blocks that the data occupies. In addition, the command includes an Operation Code (op-code) indicating the type of the command.

Command executing module 1130 reads (step 1020), into disk memory 1120, a data block(s) indicated in the command. Command executing module 1130 requests data from storage driver module 435 (step 1030). In one implementation, storage driver module 435 sends, to command executing module 1130, XOR of data blocks that will be written to disk drives and the checksum block to be written to disk.

Command executing module 1130 receives the result of the XOR operation (step 1040) and the checksum block. Then, command executing module 1130 computes new parity by XOR'ing the result of the XOR operation of the previous step with the data read into the disk memory 1120 (step 1050). At step 1060, command executing module 1130 writes the computed parity to the parity disk. At step 1070, module 1130 writes the checksum block to the parity disk. According to an embodiment of the present invention, the checksum block is written directly to the drive that stores parity for a stripe without being XOR'ed with the parity.

According to this embodiment, as a result of the execution of XPWrite command by the parity disk, the necessity for reading the old parity block by RAID controller module 436 and XOR'ing the parity block with new data is eliminated. Instead, command execution module 1130 at the disk 250 reads the old parity block, XOR's the old parity block with the XOR of new data, and writes the result of the operation to the drive that stores parity for a stripe.

Optimizing Write Operations by Removing Free Data Blocks from Parity

According to another embodiment of the present invention, write operations can be optimized if unallocated (or free data blocks) are removed from a parity block for that stripe. According to an embodiment of the present invention, file system 430 includes a write allocation module 442 (shown in FIG. 4) that performs write allocation of blocks in a volume in response to an event in the file system (e.g., dirtying of the blocks in a file). To allocate data blocks, the write allocation module 442 uses the block allocation data structures (one such structure 440 is shown in FIG. 4) to select free blocks (i.e., data blocks that are not allocated) to which to write the dirty blocks (i.e., data blocks that store data). In one embodiment, the block allocation data structure 440 can be implemented as a bitmap, in which a logical "1" indicates that a data block is allocated and logical "0" indicates that a data block is not allocated or vice versa.

When performing write allocation, file system 430 traverses a small portion of each disk (corresponding to a few blocks in depth within each disk) to "lay down" a plurality of stripes per RAID group. When performing write allocation within the volume, the write allocation module 442 typically works down a RAID group, allocating all free blocks within the stripes it passes over. This is efficient from a RAID system point of view in that more blocks are written per stripe.

According to one technique, which is described in a commonly-owned patent application U.S. Pat. No. 7,822,921, issued on Oct. 26, 2010, entitled "SYSTEM AND METHOD FOR OPTIMIZING WRITE OPERATIONS IN STORAGE SYSTEMS," by James Taylor, the disclosure of which is incorporated by reference herein, a background process is executed to zero unallocated data blocks on the disks. A data structure is kept in memory to indicate which data blocks are zeroed. When zeroed data blocks are modified, the need to read those data blocks for parity computation is eliminated. As a result, a number of read operations can be reduced.

Figure 8:
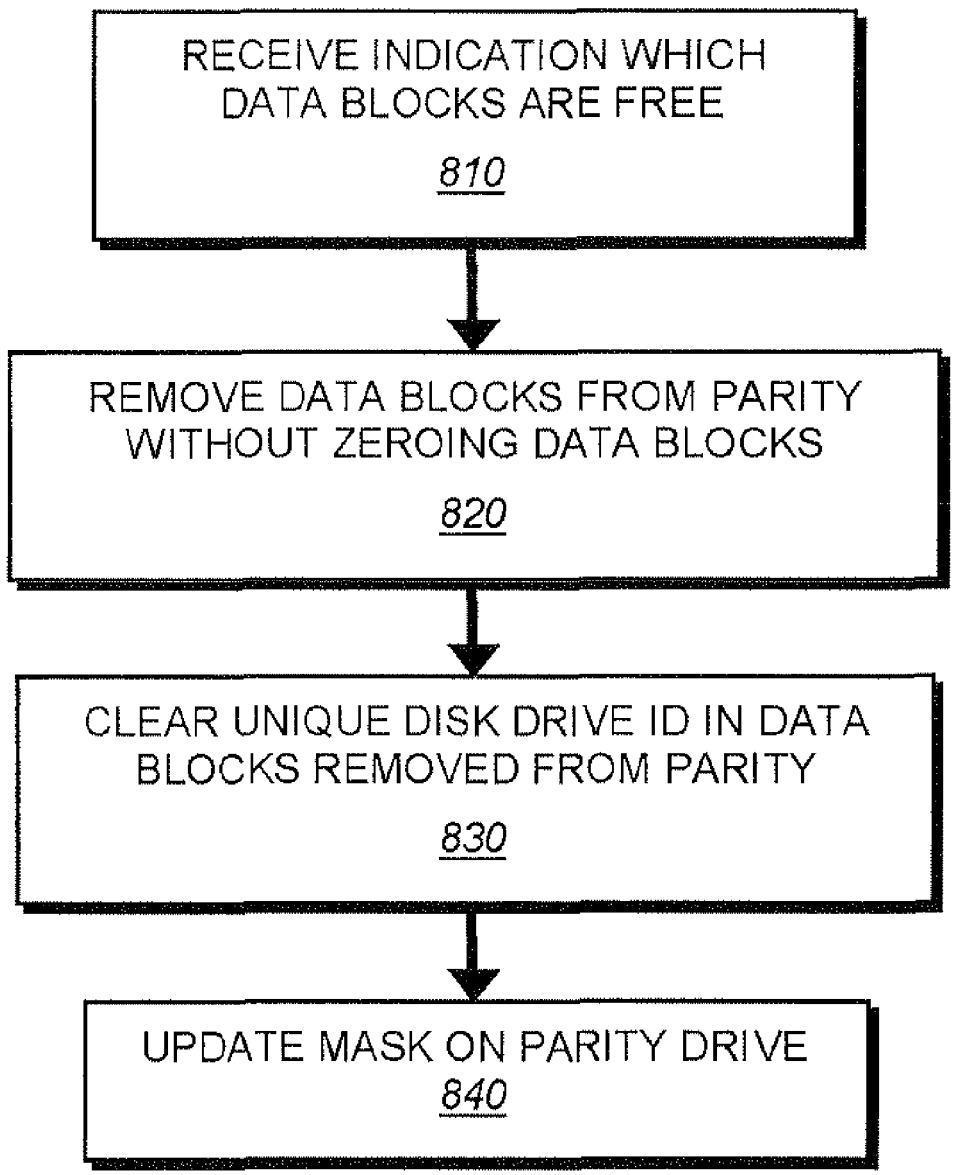
FIG. 8 is a flow diagram of a method for optimizing write operations using inventive techniques of the present invention according to yet another embodiment of the present invention.

As previously described, zeroing data blocks can be a time-consuming process. According to an embodiment of the present invention, since data from unallocated data blocks is removed from parity in a corresponding stripe, new parity can be computed without using the free data blocks even without zeroing those data blocks. FIG. 8 illustrates the steps to implement this embodiment of the present invention.

As described herein, file system 430 maintains block allocation data structure 440 in which the file system 430 keeps track of allocated and unallocated data blocks. RAID controller module 436 periodically receives an indication from file system 430 which data blocks have become unallocated or free (step 810).

At step 820, to remove unallocated data blocks from a parity block, RAID controller module 436 XOR's unallocated data blocks with the parity block for that stripe. In one embodiment, the process of removing unallocated data blocks from a parity block is performed during idle time. As used herein, "idle time" refers to a period of time during which requests from clients 210 are expected to be low (such as, for example, during weekends, holidays, and off-peak hours).

In another embodiment, the file system 430 may remove unallocated data blocks from a parity block at the same time that data are written to other data blocks in the same stripe. RAID controller module 436 then updates the parity block by XOR'ing all data blocks in the stripe except for the unallocated data blocks.

At step 830, RAID controller module 436 clears the unique disk ID in a data block (s) that is being removed from parity. At step 840, the parity mask for the stripe is updated. In one implementation, to this end, a logical AND operation is performed on the current parity mask and a complement of the mask of the drive that stores a free data block. A complement is a logical function that converts each logical "1" bit to a logical "0" bit and each logical "0" bit to a logical "1" bit. For example, if the mask stored in the checksum block on the drive that stores parity for a stripe were "0111b" (indicating that the data blocks for drive 0, drive 1, and drive 2 were contained in the parity), and the data for drive 1 were removed from parity, then the mask "0111b" would be ANDed with the complement of the mask for drive 1. The mask for drive 1 is 0010b." The complement of the mask for drive 1 is "1101b". Thus, the result of the logical AND operation on "0111b" and "1101b" is "0101b." This removes the mask of the drive that stores free data blocks from the parity mask.

This embodiment provides the number of advantages over the technique described in the referenced pending patent application. First, this embodiment eliminates the need to zero unallocated data blocks. Instead, a checksum block (which holds up to 64 bytes of data) associated with the unallocated data block(s) needs to be zeroed to clear a disk drive ID. Thus, if a size of a data block is 4 KB and a checksum block can store up to 64 bytes of data, the total number of bytes if 4160. With disk drives having 520 bytes per sector, 4160 bytes would require eight sectors. Writing zeroes to checksum blocks only is an equivalent of zeroing one sector rather than eight sectors, which results in savings of not writing data to the remaining seven sectors.

Furthermore, this embodiment, unlike the embodiments described in the referenced pending patent application, eliminates the need to maintain an additional data structure to keep track of the zeroed data blocks. A similar effect can be achieved without taking up additional resources by storing a unique disk drive ID on each disk drive and a mask and a unique disk drive ID on the disk that stores parity.

Error Recovery

A media error on a disk occurs when data cannot be read from a particular block or a number of blocks from that disk. Referring now to Table 1, it illustrates an array of disks storing data blocks. In this example, one stripe (Stripe 0) is shown for purposes of explanation only. A person of ordinary skill in the art would understand that the disk array shown in Table 1 may include more than one stripe. Disk 1 through Disk 4 store data. Disk 0 stores row parity. Thus, the exemplary disk array is implemented using RAID-4 parity scheme.

TABLE 1

| Disk Array | | | | |
|---|---|---|---|---|
| Disk 0 Row Parity | Disk 1 | Disk 2 | Disk 3 | Disk 4 |
| 9 | 0 | 2 | 3 | 4 |

Assume that Disk 1 failed (i.e., the disk experienced an operation problem that renders the disk unable to respond to read-write operations). Disk 2 stores a data block that has a media error. In general, to recover data from a data block on Disk 2 that has a media error, RAID controller module 436 would have to perform the following steps:
Read data stored on Disk 1, Disk 3, and Disk 4 for Stripe 0;
Read parity from Disk 0 for Stripe 0;
XOR data stored on Disk 1, Disk 3, and Disk 4 for Stripe 0;
XOR the result of the previous step and parity for Stripe 0.

However, since Disk 1 failed and data stored on Disk 1 cannot be provided to recover data stored on Disk 2, data block that has a media error on Disk 2 could not be recovered.

According to the technique described in the above-referenced commonly-owned U.S. Pat. No. 7,822,921, if Disk 1 were zeroed, the need to read Disk 1 to recover data from Disk 2 would be eliminated.

The present invention provides the same benefits of not reading data blocks from the failed disk drive, but, unlike the referenced patent application, it does not require the data block on Disk 1 for that stripe to be zeroed. This is accomplished by determining whether a data block on a failed drive in a stripe where a media error was detected is valid. In one implementation, RAID controller module 436 performs a logical AND operation on the parity mask for the stripe and the mask of the failed drive. If a result of the logical operation does not contain a logical bit "1", it indicates that data from the failed drive are not included in the parity block for that stripe and was written prior to adding the drive to the RAID group or before the RAID group was formed, or was removed from parity after the data block became free. As such, the data from the failed drive can be ignored and need not be read to recover data from another data block in the stripe. This allows storage server 200 to recover data from the data block that has a media error in an array that has a failed drive without zeroing the failed drive in RAID-4 or RAID-5. Furthermore, this embodiment allows storage server 200 to recover data in a dual parity RAID array with two failed drives and a third drive failure or a media error on a third disk.

Data Reconstruction

Occasionally, disks experience an operational problem that either degrades disks' read-write performance or causes a disk failure. Conventionally, spare disks are used to replace failed disks. Once the storage system replaces the failed disk with the spare disk, it begins a process of reconstructing data from the failed disk. The reconstruction process can be performed intermittently with normal I/O operations. The process of data reconstruction involves reading data from all disks other than the failed disk, XOR'ing the data being read, and writing the result of the XOR operation to a spare disk, which becomes a reconstructing disk once it replaces the failed disk. Thus, to reconstruct data in a stripe, multiple read operations and at least one write operation have to be performed. Performing multiple read operations during the reconstruct process results in rotation latency, thereby increasing overall time required to perform a reconstruct process. In addition, performance of the storage system suffers during reconstruct time since regular I/O operations are performed at the same time. Furthermore, if during a reconstruct process a second disk fails, or has a media error, it is impossible to reconstruct data in RAID-4 or RAID-5. In a dual parity RAID array with two failed drives and a third drive failure or a media error on a third disk, some or all data would not be recoverable.

According to an embodiment of the present invention, the number of I/O operations can be reduced to reconstruct data from the failed drive by not reading or reconstructing invalid data blocks, e.g., data blocks that were written prior to creating a RAID group or adding the respective drives to existing RAID groups, or blocks that were removed from the parity after they became free. This can be done even without zeroing these data blocks.

According to an embodiment of the present invention, instead of reading data blocks from all disks in a stripe, RAID controller module 436 determines whether a data block in a stripe is included in the parity block for that stripe. To this end, in one implementation, RAID controller module 436 performs a logical AND operation on the parity mask for the stripe and the mask of the disk drive that needs to be read for purposes of reconstructing data on the failed drive. If a result of the logical operation does not contain a logical bit "1", it indicates that data from that disk drive are not included in the parity block for that stripe. Therefore, the data were written prior to adding the disk to the RAID array or prior to forming the array, or was removed from the parity for the stripe when the data block became free. As such, this data block does not need to be read and can be ignored for purposes of reconstructing data on the failed drive. Additionally, if the data block to be reconstructed is invalid, then it does not need to be reconstructed and no reads or writes are required for that stripe.

Copying Data from a Sick Disk

Occasionally, when a disk drive in an array reports multiple errors, it is common to copy data from that disk drive (also referred to herein as a "sick disk") onto a spare disk before the disk drive is failed. Conventionally, to copy data from the sick disk onto a spare disk requires multiple read and write operations. Performance of the storage system suffers during the time the data are copied since regular I/O operations are performed at the same time.

According to an embodiment of the present invention, the number of read and write operations is reduced by determining which data blocks were written prior to creating a RAID group or being added to the RAID group, or have become free and were removed from the parity for the stripe and thus do not need to be copied. According to the present invention, data blocks that are not included in the parity block for the same stripe were written prior to adding their respective drives to the RAID array or these data blocks have become free. To determine whether a data block is included in the parity, in one implementation, RAID controller module 436 performs a logical AND operation on the parity mask for a stripe and the mask of the disk drive that includes a data block that is about to be copied onto another disk. If a result of a logical operation does not contain a logical bit "1", it indicates that the data block is not included in the parity block for that stripe. These data blocks are not being copied. Hence, this reduces the number of I/O operations that would otherwise have to be performed to copy data blocks from a sick disk. This also reduces the reliance on the sick disk and allows the valid data to be copied onto a spare disk faster.

Thus, embodiments of the present invention provide a method, system, and computer program product for providing an indication whether a disk stores data that were written prior to the disk being added to an existing array of disks or have become free and were removed from parity for a stripe. Knowing that a data block was written prior to being added to the array or has become free and was removed from parity allows a storage server to ignore invalid data and not to use it for purposes of parity computation. This, in turn, eliminates the need to zero disks or to perform parity re-computation prior to using the disks to ensure that the parity is consistent with the data in the correspondent stripe in the array.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Although the present invention is described in terms of using RAID-4, it can be adapted by those of skill in the art to be used in other implementations, such as RAID-5, RAID-DP, etc. Furthermore, although the present invention is described using the file system, the RAID controller, and the disk driver system, those of skill in the art would understand that the invention can be practiced with other modules.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method performed by a computer connected to a storage array having a plurality of storage devices, comprising:
   determining by a processor of the computer whether a block in a stripe is to be included in a parity block for the stripe;
   in response to determining that the block in the stripe is to be included in the parity block, determining whether the block is valid;
   in response to determining that the block is invalid, ignoring the block to update the parity block for the stripe; and
   in response to determining that the block is valid, updating the parity block using the block in the stripe.

2. The method of claim 1, further comprising assigning a first mask to each storage device of the plurality of storage devices in the storage array.

3. The method of claim 2, further comprising updating a second mask of a particular storage device to which new data are written that stores parity for the stripe in the array.

4. The method of claim 1, wherein each storage device of the plurality of storage devices comprises a disk drive.

5. The method of claim 1, further comprising:
   inserting, into a checksum block of a new data block of the stripe, a unique storage device identification (ID) of a storage device of the plurality of storage devices where the new data block will be written; and
   writing the new data block and an associated checksum block to the storage device identified by the unique storage device ID.

6. The method of claim 1, further comprising:
   inserting, into a checksum block associated with the parity block, a unique storage device identification (ID) of a storage device of the plurality of storage devices where the parity block will be written; and writing the parity block and the checksum block to the storage device where the parity block will be written.

7. The method of claim 1 wherein determining whether the block is valid comprises:
   storing a unique storage device identification (ID) on a storage device of the plurality of storage devices in the storage array storing the block;
   responsive to receiving an access request that comprises a write operation and associated data, reading a data block in the stripe that is not to be modified and an associated checksum block; and
   comparing the unique storage device ID to the data stored in the checksum block.

8. A computer configured to perform input/output (I/O) operations for a storage array having a plurality of storage devices, comprising:
   a processor configured to execute one or more processes, the one or more processes, when executed, configured to:
   determine whether a block in a stripe is to be included in a parity block for the stripe;
   determine, in response to determining that the block in the stripe is to be included in the parity block, whether the block is valid;
   ignore, in response to determining that the block is invalid, the block to update the parity block for the stripe; and
   update, in response to determining that the block is valid, the parity block using the block in the stripe.

9. The method of claim 7, wherein the unique storage device ID is read from a memory of the computer.

10. The computer of claim 8, further comprising a storage module coupled to the processor, the storage module configured to insert, in a checksum block associated with a data block that stores data in an access request, a unique identification (ID) of a storage device of the plurality of storage devices in the storage array where the data in the access request will be written.

11. The computer of claim 8, further comprising a storage module coupled to the processor, the storage module configured to insert, in a checksum block associated with the parity block, a unique identification (ID) of a storage device of the plurality of storage devices where the parity block will be written.

12. The computer of claim 8, further comprising a memory coupled to the processor for storing a mask of each storage device of the plurality of storage devices in the storage array.

13. The computer of claim 8, wherein each storage device of the plurality of storage devices comprises a disk drive.

14. The computer of claim 8 further comprising:
   a storage module coupled to the processor and configured to store a unique storage device identification (ID) on a storage device of the plurality of storage devices in the storage array; and
   responsive to receiving an access request that comprises a write operation and associated data, the storage module further configured to read a data block in the stripe that is not to be modified and an associated checksum block, and further configured to compare the unique storage device ID to the data stored in the checksum block.

15. A computer-readable storage medium stored with program instructions for execution by a processor, the computer-readable storage medium comprising:
   program instructions that determine whether a block in a stripe is to be included in a parity block for the stripe;
   program instructions that determine, in response to determining that the block in the stripe is to be included in the parity block, whether the block is valid;
   program instructions that ignore, in response to determining that the block is invalid, the block to update the parity block for the stripe; and
   program instructions that update, in response to determining that the block is valid, the parity block using the block.

* * * * *